US009501895B2

(12) United States Patent
Toompere

(10) Patent No.: US 9,501,895 B2
(45) Date of Patent: Nov. 22, 2016

(54) METHODS AND DEVICES FOR ANONYMOUS COMPETITION

(75) Inventor: Ragnar Toompere, Douglas (GB)

(73) Assignee: Cork Group Trading Ltd., Road Town, Tortola (VG)

( * ) Notice: Subject to any disclaimer, the term of this patent is extended or adjusted under 35 U.S.C. 154(b) by 1729 days.

(21) Appl. No.: 12/704,016

(22) Filed: Feb. 11, 2010

(65) Prior Publication Data
US 2011/0195766 A1 Aug. 11, 2011

(51) Int. Cl.
A63F 13/00 (2014.01)
G07F 17/32 (2006.01)

(52) U.S. Cl.
CPC ........... *G07F 17/3239* (2013.01); *G07F 17/32* (2013.01); *G07F 17/3276* (2013.01); *G07F 17/3293* (2013.01)

(58) Field of Classification Search
CPC ..................... A63F 13/70–13/75; A63F 13/79; A63F 13/798; A63F 2300/5526; A63F 2300/5546; A63F 2300/5553; A63F 2300/556; H04L 67/30
USPC ........ 463/42, 16, 31; 345/419; 715/751, 765
See application file for complete search history.

(56) References Cited

U.S. PATENT DOCUMENTS

| 5,704,835 | A | 1/1998 | Dietz, II |
| 6,416,407 | B1 | 7/2002 | Carrico et al. |
| 6,443,841 | B1 * | 9/2002 | Rossides ............. F21V 19/0085 463/16 |
| 7,393,278 | B2 | 7/2008 | Gerson et al. |
| 7,503,006 | B2 * | 3/2009 | Danieli .......................... 715/751 |
| 7,828,661 | B1 * | 11/2010 | Fish ........................ A63F 13/12 463/42 |
| 8,271,894 | B1 * | 9/2012 | Mayers ......................... 715/765 |
| 2004/0097287 | A1 | 5/2004 | Postrel |
| 2005/0059451 | A1 | 3/2005 | Shackleford |
| 2005/0096133 | A1 | 5/2005 | Hoefelmeyer et al. |
| 2005/0209001 | A1 | 9/2005 | Moshal |
| 2006/0149561 | A1 | 7/2006 | Govender |
| 2007/0155460 | A1 | 7/2007 | Burnside et al. |
| 2007/0255643 | A1 * | 11/2007 | Capuano ................ G06Q 30/00 705/37 |
| 2008/0254883 | A1 * | 10/2008 | Patel et al. ....................... 463/31 |
| 2008/0303811 | A1 * | 12/2008 | Van Luchene ................ 345/419 |

(Continued)

OTHER PUBLICATIONS

Ebay Usernames with ***; posted Oct. 26, 2008; printed from the internet Mar. 6, 2012; at <<http://ask.metafilter.com/10 5209/ebay-usernames-with-between-to-charactersfraud-snipes-what-is-this>>; 3 pages.*

(Continued)

*Primary Examiner* — Steven J Hylinski
(74) *Attorney, Agent, or Firm* — McDonnell Boehnen Hulbert & Berghoff LLP

(57) ABSTRACT

Methods and devices are presented for facilitating anonymous gameplay in multi-state, multiplayer games, such as poker. A gaming server may allow players to anonymously join instances of a game. The gaming server may represent an anonymous player to himself or herself using a non-anonymous alias, while the gaming server may represent the anonymous player to the other players or entities using an anonymous alias. Additionally, the gaming server may record events occurring in the game, and provide similarly anonymized versions of these events to other players and entities.

70 Claims, 15 Drawing Sheets

(56) References Cited

U.S. PATENT DOCUMENTS

| | | | |
|---|---|---|---|
| 2009/0061974 | A1 | 3/2009 | Lutnick et al. |
| 2009/0104960 | A1* | 4/2009 | Kelly .................. G07F 17/3276 463/16 |
| 2009/0131175 | A1* | 5/2009 | Kelly et al. ..................... 463/42 |
| 2010/0113162 | A1* | 5/2010 | Vemuri et al. .................. 463/42 |
| 2010/0161747 | A1* | 6/2010 | Rayan ................ G06F 21/6263 709/206 |
| 2010/0333178 | A1* | 12/2010 | Suthoff ............... G06F 21/6254 726/4 |
| 2011/0190066 | A1* | 8/2011 | Barclay et al. ................. 463/42 |
| 2013/0254215 | A1* | 9/2013 | Davar ............... G06F 17/30861 707/748 |

OTHER PUBLICATIONS

Bid History; posted Mar. 4, 2012; Printed from the Internet Mar. 6, 2012; at <<http://offer.ebay.com/ws/eBayISAPI.dll?ViewBids&_trksid=p4340.l2565&rt=nc&item=150771571637>>; 2 pages.*

Ebay introduces absolute anonymity for bidders; posted Jul. 2, 2008; printed from the internet on Mar. 6, 2012; at <<http://www.maestronet.com/forum/index.php?showtopic=317973>>; 10 pages.*

Bidder Anonymity/ Red Ink Diary; posted Sep. 24, 2009; printed from the internet on Mar. 6, 2012; at <<http://200westmain.com/redinkdiary/?tag=bidder-anonymity>>; 7 pages.* eBay Auction ended; posted Oct. 28, 2012; Printed from the Internet Mar. 27, 2013; at <<http://www.ebay.co.uk/itm/Marzocco-Linea-2-Group-Espresso-Coffee-Machine-/321007024964>>; 4 pages.* eBay Auction ended bid history; posted Oct. 28, 2012; Printed from the internet Mar. 27, 2013; at <<http://offer.ebay.co.uk/ws/eBayISAPI.dll?ViewBids&_trksid=p2047675.l2565&rt=nc&item=321007024964>>; 2 pages.*

"Bid History", published Dec. 10, 2008. Source file uploaded Jan. 2009. Source http://www.originalprop.com/blog/wpcontent/uploads/2009/01/charliechaplinscreenusedcanevintagerarepropendedbidhistory.*

"Why do some Ebay usernames have stars in them?" Source http://forums.onlinesweepstakes.com/showthread.php?t=675829. URL published Apr. 8, 2008.*

"Bidding Overview", source https://web.archive.org/web/20091211234335/http://pages.ebay.com/help/buy/biddingoverview.html#fine. Accessed as of Dec. 11, 2009.*

"Protecting your Privacy", source https://web.archive.org/web/20091212021455/http://pages.ebay.com/help/account/protectingprivacy.html. Accessed as of Dec. 12, 2009.*

"A Message From Matt Halprin—Protecting Bidders & Combating Online Fraud", source http://www2.ebay.com/aw/core/200803030932242.html?rmvSB=true Published Mar. 3, 2008.*

European Patent Office, European Search Report for European Patent Application EP 11275027.8, May 26, 2011.

Two Plus Two Poker Forums—Poll: Should anonymity be allowed in Rush Poker? p. 1 of 2, downloaded from the World Wide Web at http://forumserver.twoplustwo.com/28/internet-poker/poll-should-anonymity-allowed-rush-poker-694741/ on Jan. 29, 2010, 34 pages.

Two Plus Two Poker Forums—Poll: Should anonymity be allowed in Rush Poker? p. 2 of 2, downloaded from the World Wide Web at http://forumserver.twoplustwo.com/28/internet-poker/poll-should-anonymity-allowed-rushpoker-694741/ on Jan. 29, 2010, 29 pages.

CardRunners Blog Network—David Benefield : Poker Blog, Sep. 12, 2008, Multiaccounting, downloaded from the World Wide Web at http://blogs.cardrunners.com/davidb/Multiaccounting, 2 pages.

Australian Patent Examination Report No. 3 for Patent Application No. 2011200313 dated Sep. 7, 2012, 3 pages.

Australian Office Action for patent application No. 2011200313, dated Feb. 17, 2012.

* cited by examiner

| 302 | ALIAS | ALICE1064 | BSMITH |
|---|---|---|---|
| 304 | EMAIL ADDRESS | AJONES@ISP.COM | BOB12@XYZ.ORG |
| 306 | PASSWORD | ******** | ******** |
| 308 | NAME | ALICE JONES | ROBERT SMITH |
| 310 | BIRTHDAY | OCTOBER 27, 1964 | JANUARY 15, 1986 |
| 312 | CREDITS | $976 | $22,312 |

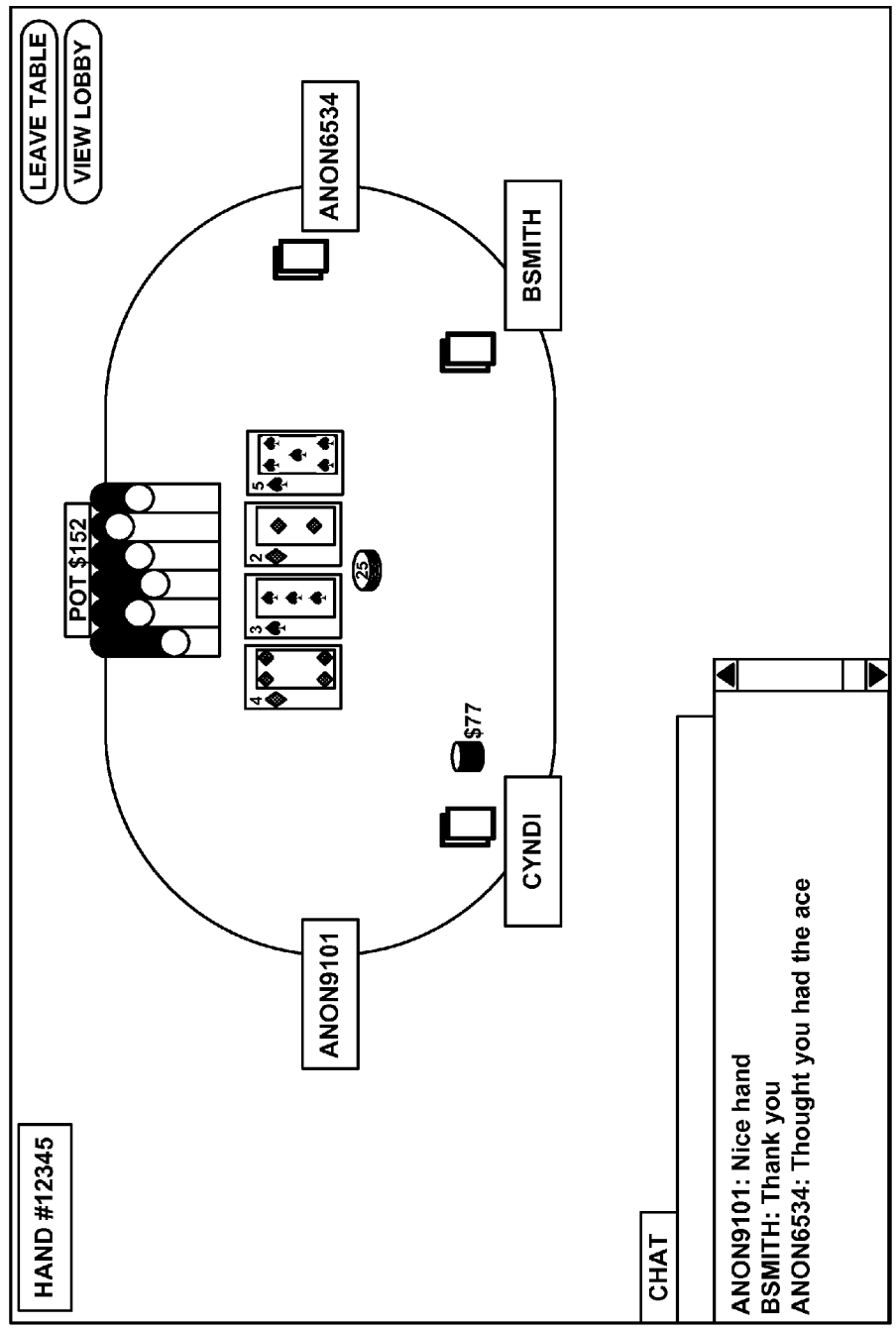

| Default Alias | ALICE1064 | BSMITH | CYNDI | BIGD |
|---|---|---|---|---|
| Anonymous Alias | ANON6534 | | | ANON9101 |
| Hole Cards | AS, KH | 7C, 2D | 4H, 5S | 8C, 9C |
| Wagering Round 1 | CHECK | 1 | FOLD | 2 |
| | 2 | 2 | | |
| Flop | 9S, 10D, JH | 9S, 10D, JH | 9S, 10D, JH | 9S, 10D, JH |
| Wagering Round 2 | 5 | 5 | | 5 |
| Turn | 7H | 7H | 7H | 7H |
| Wagering Round 3 | 5 | FOLD | | 5 |
| River | AH | AH | AH | AH |
| Wagering Round 4 | 15 | | | 10 |
| | | | | 5 |
| Winner / Pot | | | | 61 |

| Players | ALICE1064 | BSMITH | CYNDI | ANON9101 |
|---|---|---|---|---|
| *Hole Cards* | AS, KH | XXXXXX | XXXXXX | 8C, 9C |
| *Wagering Round 1* | CHECK | 1 | FOLD | 2 |
|  | 2 | 2 |  |  |
| *Flop* | 9S, 10D, JH | 9S, 10D, JH | 9S, 10D, JH | 9S, 10D, JH |
| *Wagering Round 2* | 5 | 5 |  | 5 |
| *Turn* | 7H | 7H | 7H | 7H |
| *Wagering Round 3* | 5 | FOLD |  | 5 |
| *River* | AH | AH | AH | AH |
| *Wagering Round 4* | 15 |  |  | 10 |
|  |  |  |  | 5 |
| *Winner / Pot* |  |  |  | 61 |

| Players | ANON6534 | BSMITH | CYNDI | ANON9101 |
|---|---|---|---|---|
| Hole Cards | AS, KH | 7C, 2D | XXXXX | 8C, 9C |
| Wagering Round 1 | CHECK | 1 | FOLD | 2 |
| | 2 | 2 | | |
| Flop | 9S, 10D, JH | 9S, 10D, JH | 9S, 10D, JH | 9S, 10D, JH |
| Wagering Round 2 | | 5 | | 5 |
| Turn | 7H | 7H | 7H | 7H |
| Wagering Round 3 | | | | 5 |
| | 5 | FOLD | | |
| River | AH | AH | AH | AH |
| Wagering Round 4 | | | | 10 |
| | 15 | | | 5 |
| Winner / Pot | | | | 61 |

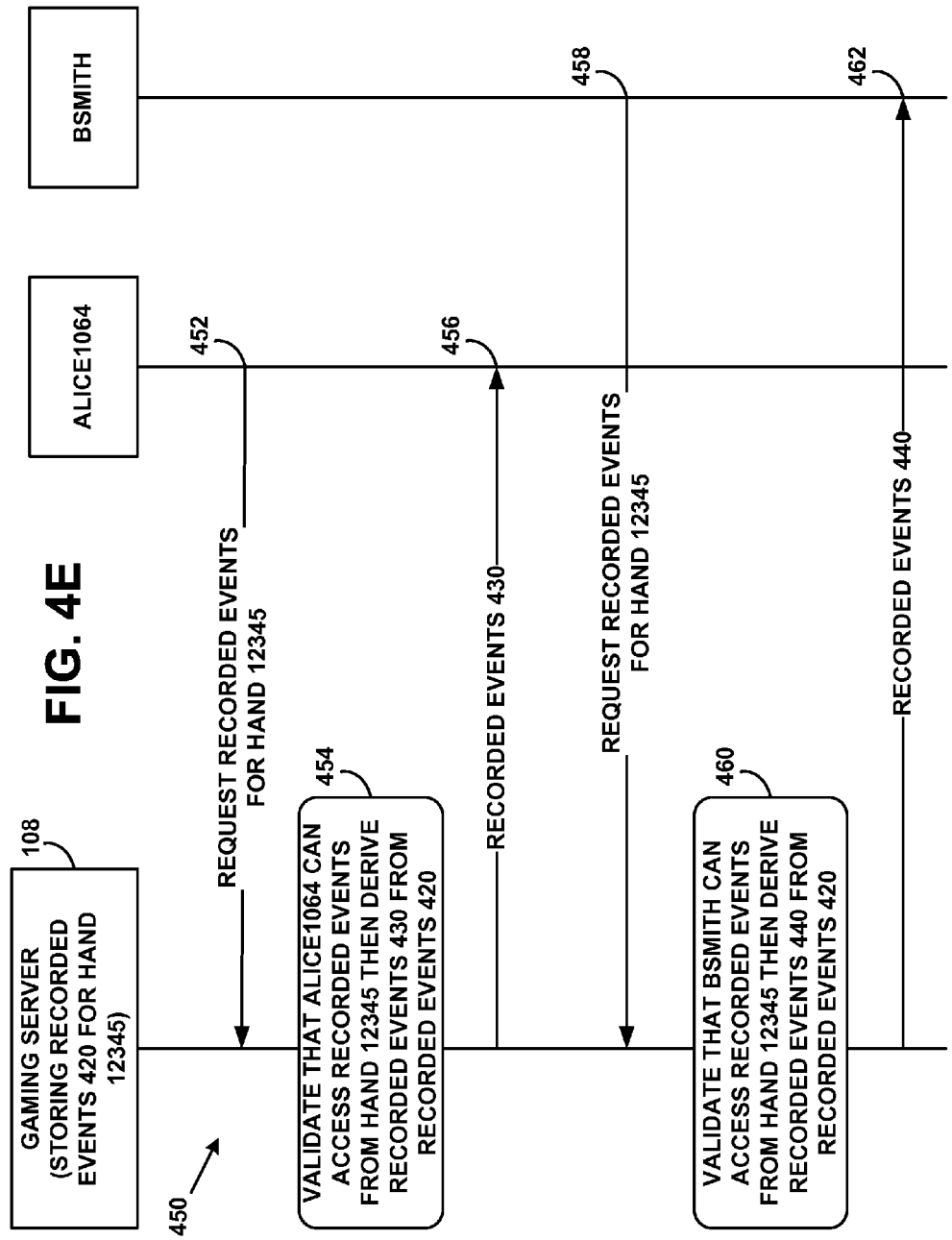

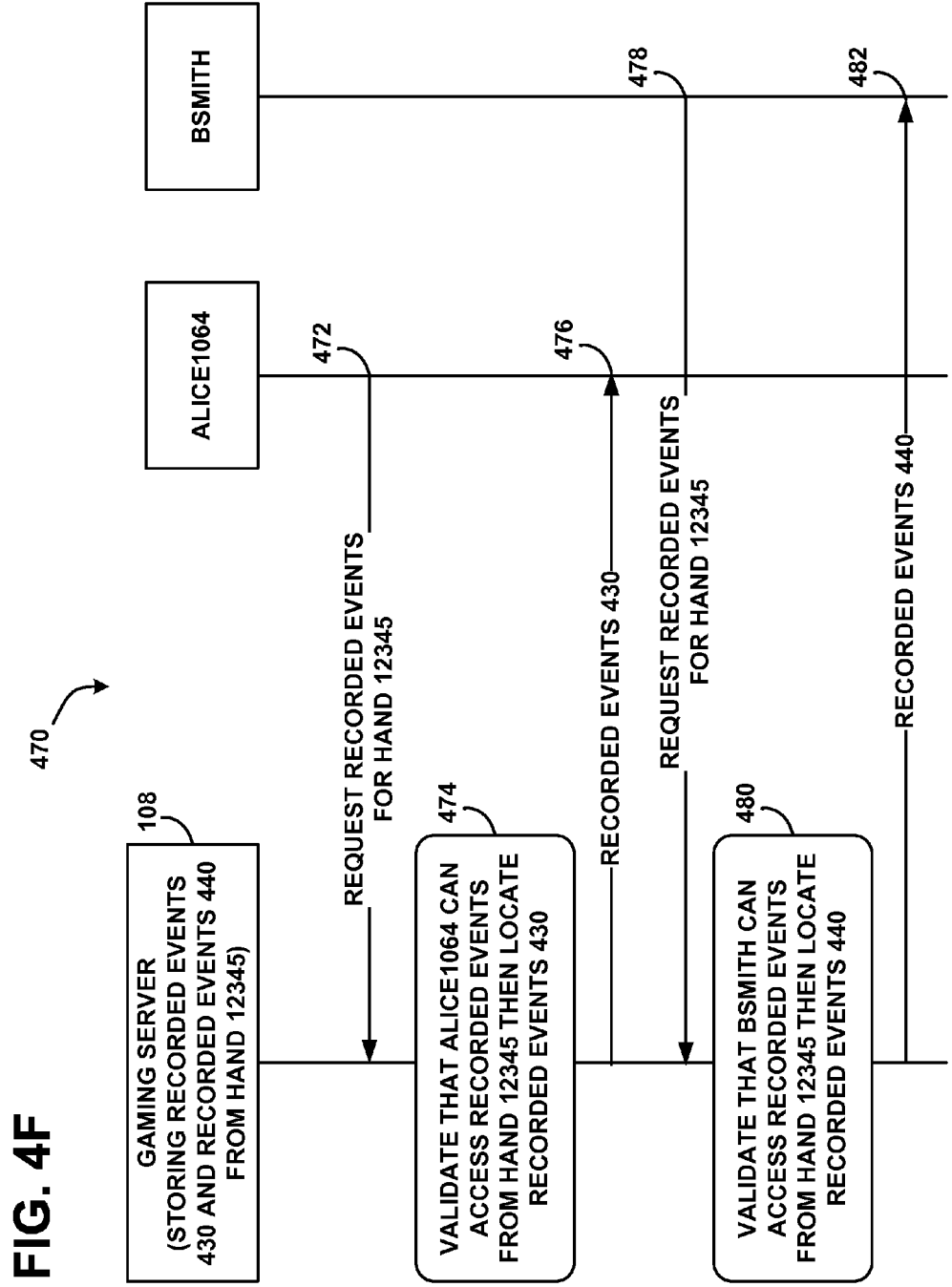

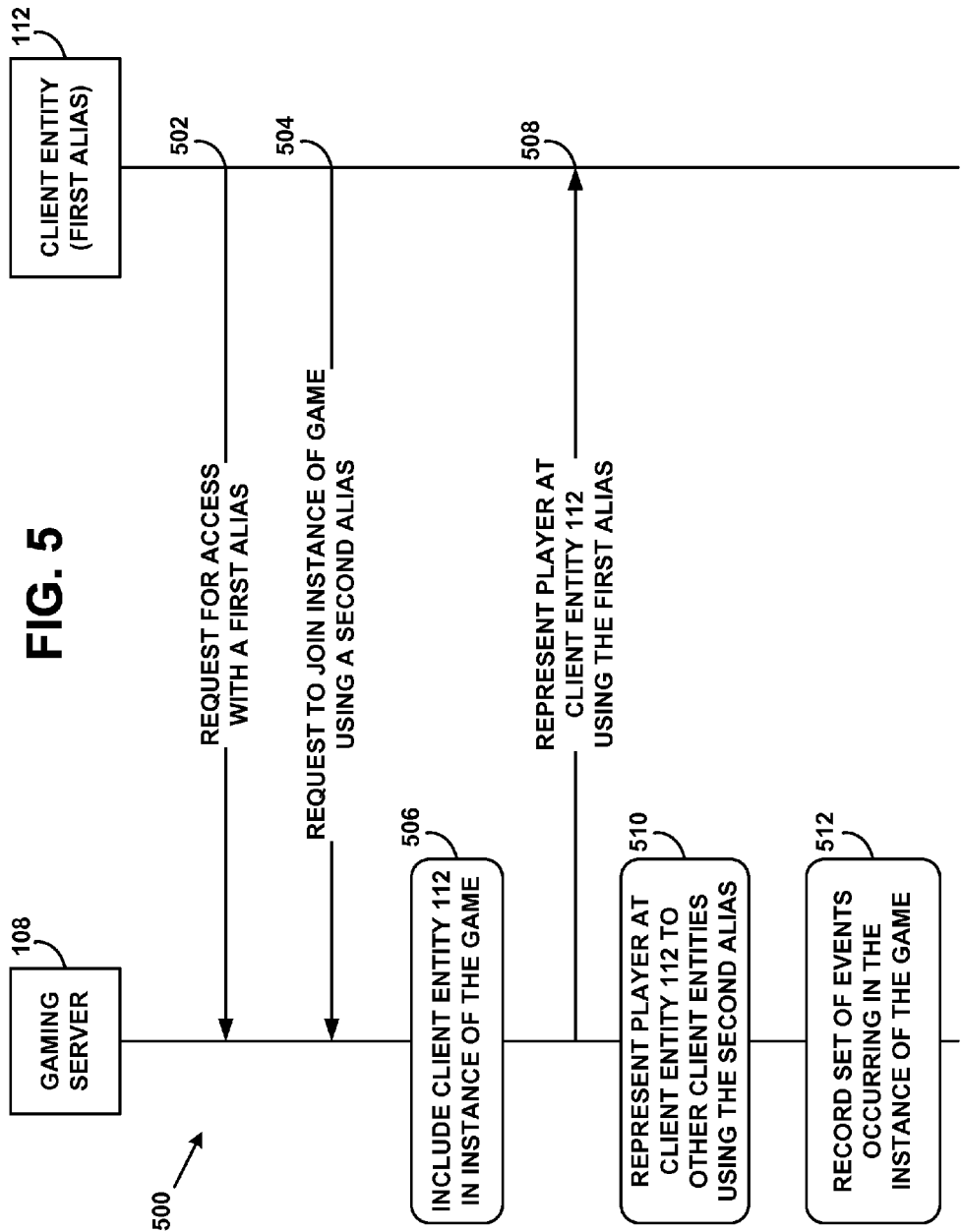

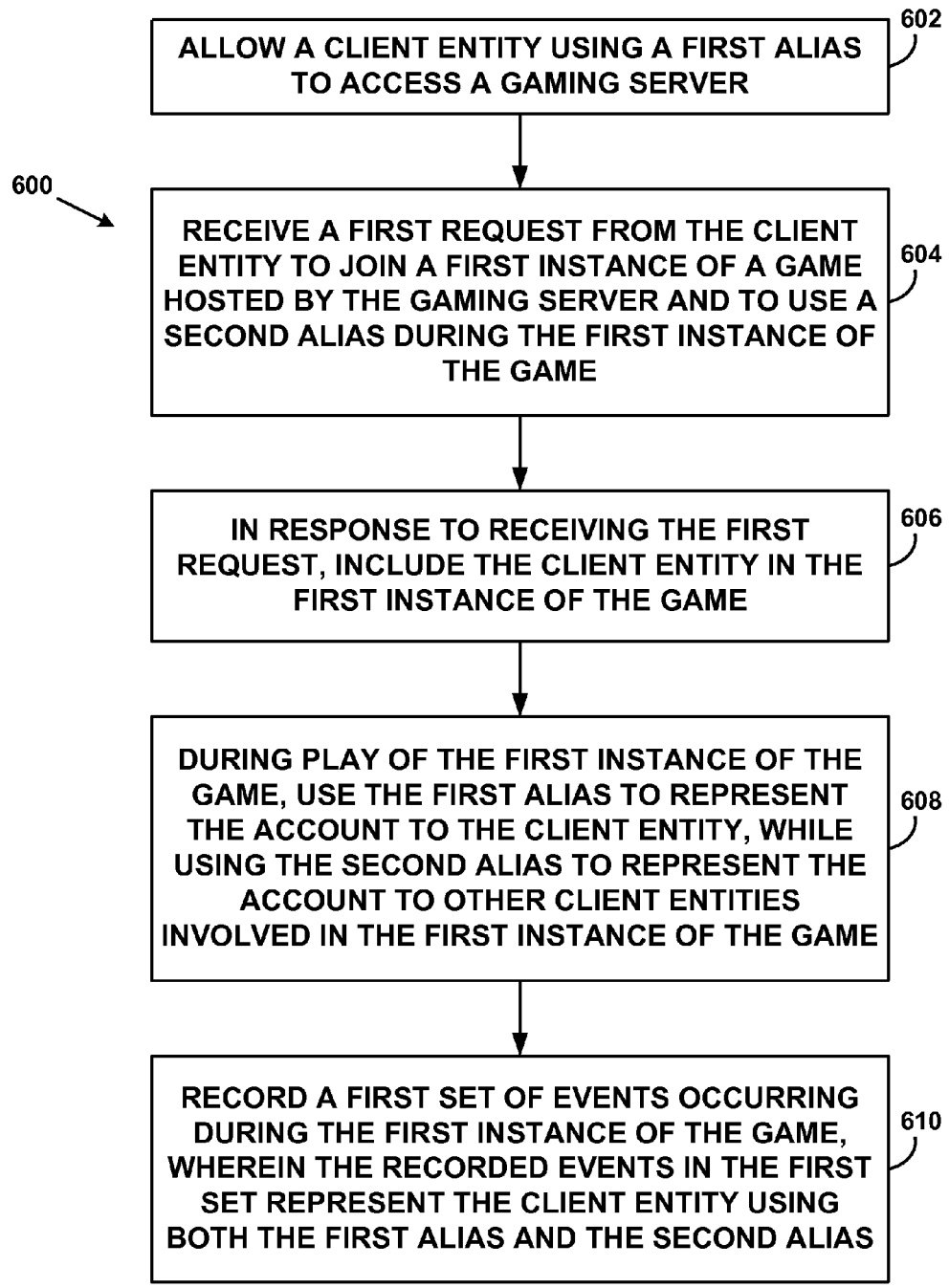

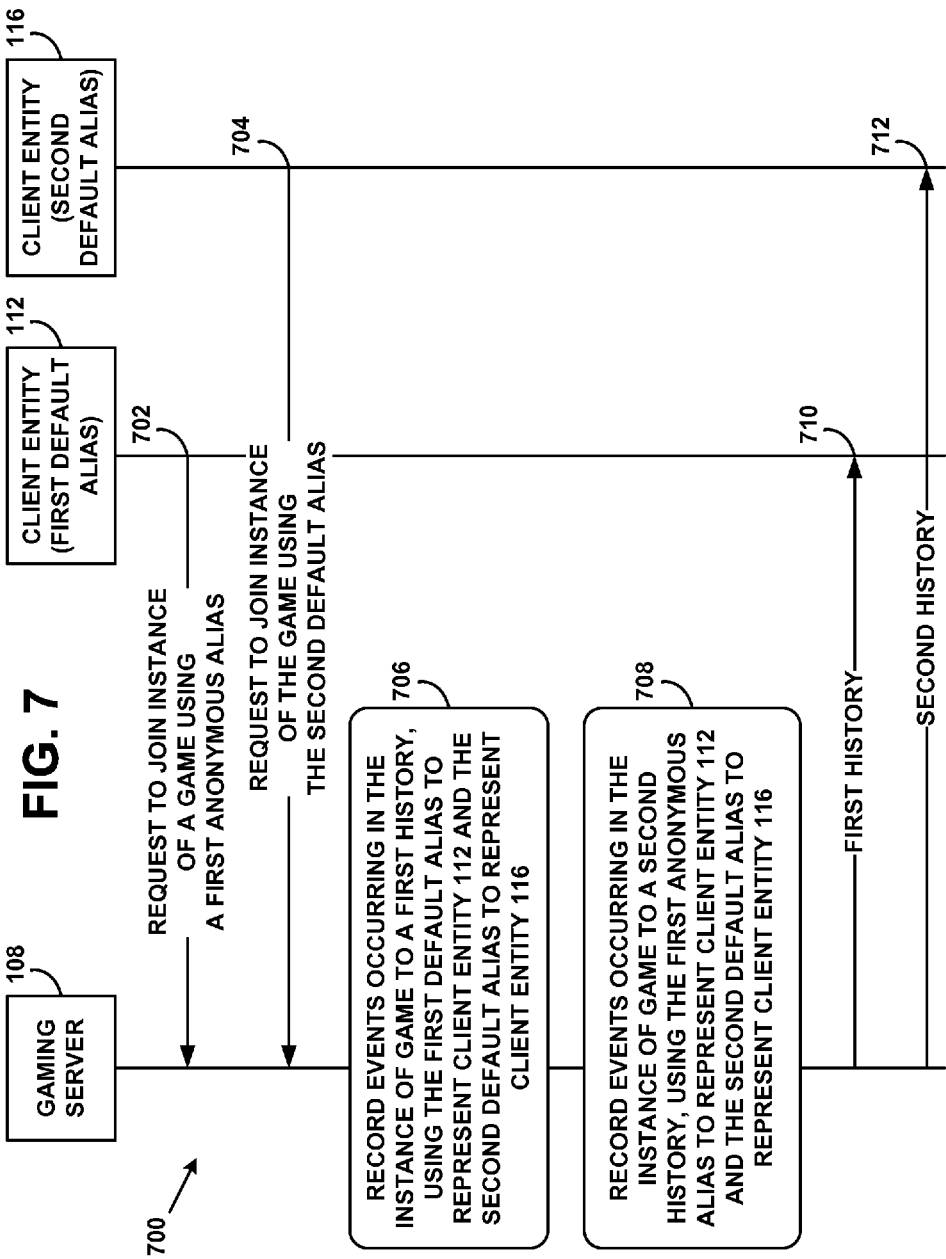

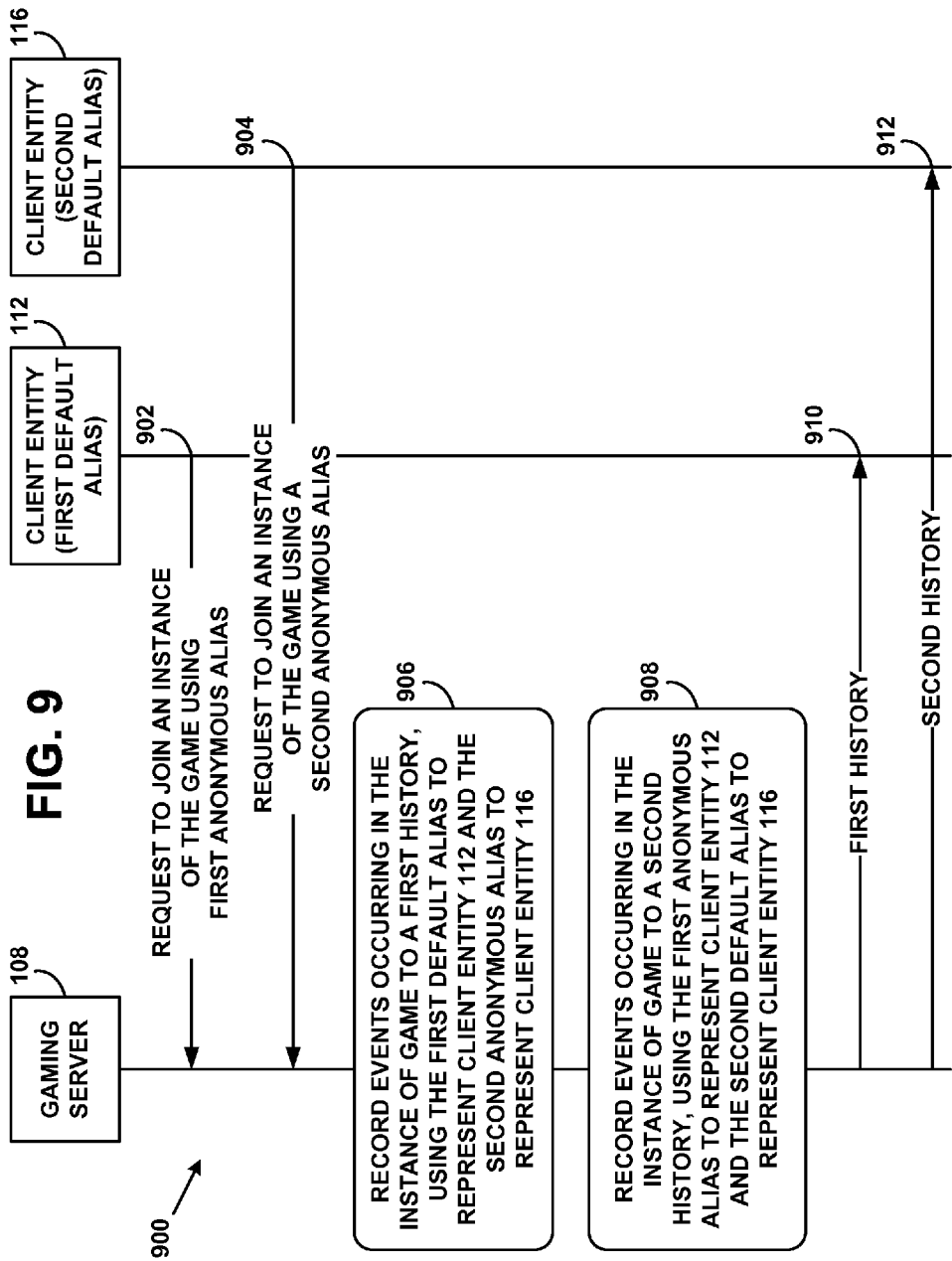

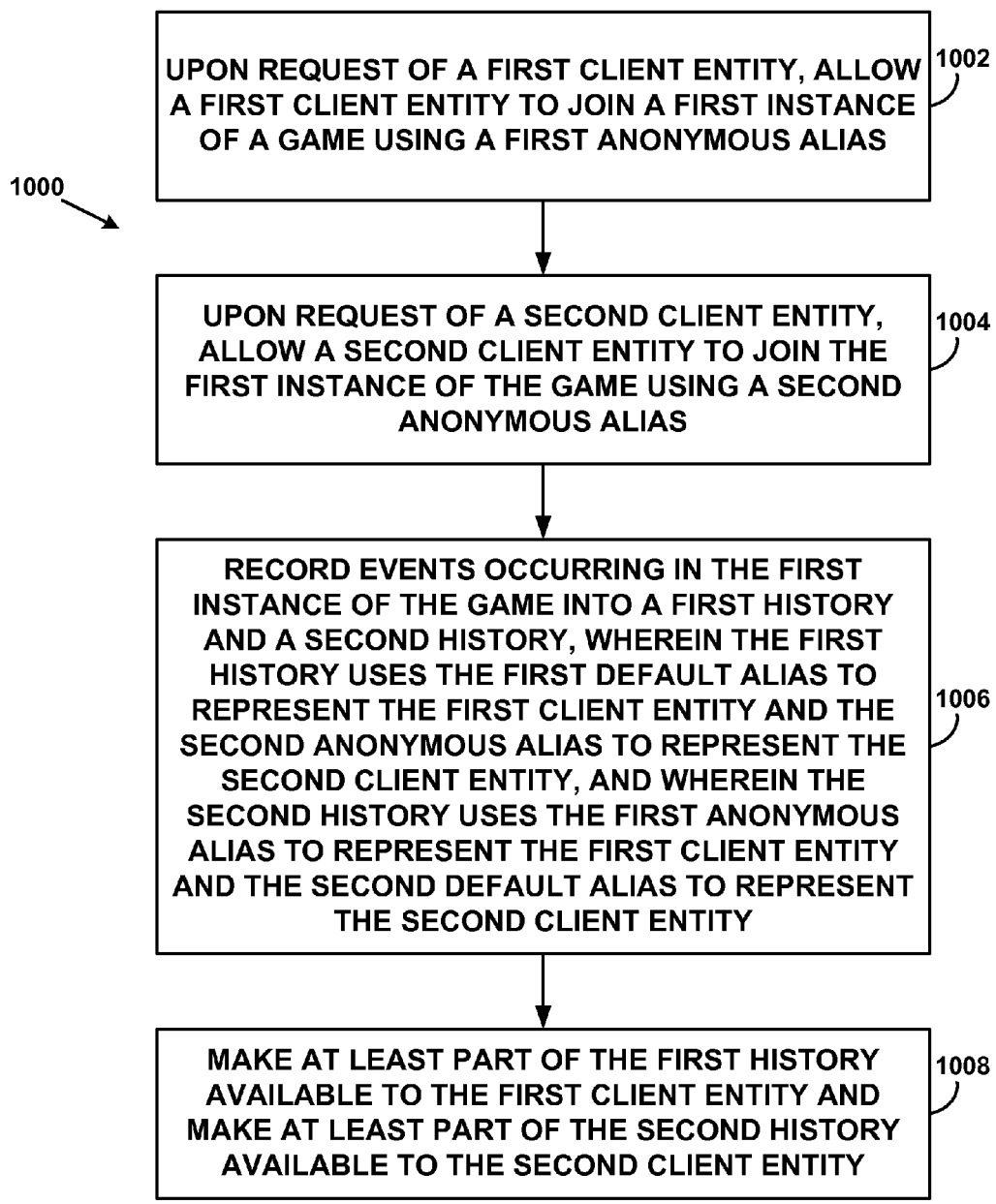

METHODS AND DEVICES FOR ANONYMOUS COMPETITION

BACKGROUND

Online gaming rooms typically involve one or more human players logging in to a networked gaming server and competing against one another in games of skill and/or luck. These games may be played for just for purposes of entertainment, or for monetary gain. Some of the more popular types of online games include card games such as blackjack, baccarat, and poker.

The online gaming experience is different from that of in-person, or "brick and mortar," gaming. As just one example, online games lack physical interaction between players. In some types of games, skilled players may read physical cues, or "tells," of their opponents in order to gain an advantage of over these opponents. Skilled players may also observe their opponents' style of play over time to determine their opponents' strategies and skill level. Thus, skilled players, in general and on average, may be able to prevail over lesser-skilled players due to this physical interaction. Since this level of interaction is absent from online games, some players of online games may seek other means of gaining an advantage over their opponents.

Online gaming also differs from brick and mortar gaming in that, as a computer-mediated system, detailed online gaming history can be observed and stored. For instance, a gaming server that operates online gaming rooms may store the history of every hand of cards played on the server. Furthermore, a player may employ other software programs to record the history of each hand in which the player participates. As a result, rich databases of hand history are available.

By employing statistical analysis tools, the gameplay statistics of particular players can be analyzed to determine those players' behavior and strategies, as well as their overall skill level. For instance, if a given player has a penchant for a particular style of play, this penchant may become apparent through such an analysis. Thus, players who use these tools may gain an advantage over their opponents.

Use of such tools has led to situations in which players who have access to the tools choose to play online games only or mostly against lesser-skilled opponents. This allows the players with access to the tools to prey on new and inexperienced players, while avoiding playing against highly-skilled and experienced players. Thus, novice players often lose games, and potentially their bankrolls as well, more rapidly than otherwise would be the case. As a result, these novice players may become discouraged and cease playing online games.

SUMMARY

The methods and devices disclosed herein supply ways of providing anonymous competition. In particular, for games a player plays anonymously, these methods and devices also anonymize parts of the player's gameplay history. However, when the same player plays these games non-anonymously, the player's gameplay history remains non-anonymous. In this way, the player can choose to hide his or her gameplay history from other players. Thus, a novice player may be able to engage in online games without fear of being selectively preyed upon by more experienced players.

While these methods and devices potentially benefit players, other entities may benefit as well. For instance, popular online games, including card games such as blackjack, baccarat, and poker, are typically provided and/or operated by a "house." The house may be an individual or organization (e.g., a casino) that makes the games available to player. The house may derive incremental revenue from games played using its services. For example, the house may receive a commission, or "rake," of 5%-10% of the winnings of each game played. Thus, if novice players are encouraged to play more online games, the house may benefit from larger overall profits.

Accordingly, in a first example embodiment, a gaming server may conduct games and have access to player accounts. A player may be associated with such an account, and the account may define a first alias with which the player can engage in an instance of a game. Thus, the gaming server may allow a client entity using the first alias to access the gaming server. The first alias may be a non-anonymous alias that identifies the player and/or the player's account. Preferably, a player uses the client entity to access the gaming server over a communication network.

Thus, the gaming server may receive a first request from the client entity, on behalf of the player, to join an instance of a game hosted by the gaming server. However, the client entity may also request to use a second alias during the instance of the game. The second alias may be an anonymous alias used by the client entity to join the instance of the game so that other players in the same instance of the game cannot readily determine the identity of the player. In response to receiving the first request, the gaming server may include the client entity in the instance of the game.

During play of the instance of the game, the gaming server preferably uses the first alias to represent the player to the client entity, but uses the second alias to represent the player to other client entities involved in the first instance of the game. In this way, the player may be able to view himself or herself as represented by the non-anonymous first alias, and his or her opponents can only view the player's anonymous alias. Thus, without an association between the first alias and the second alias being made available to other parties, the player is less likely to be preyed upon by more experienced players using gameplay analysis tools.

Furthermore, the gaming server may record events occurring during the instance of the game, where the recorded events represent the client entity using both the first alias and the second alias. By storing both aliases in the recorded events, the gaming server can later provide these events to an entity that requests gameplay history either with the client entity represented using the first alias or the second alias. For instance, the gaming server may represent the client entity using the first alias in events the gaming server provides to the client entity, while representing the client entity using the second alias in events the gaming server provides to other parties.

In a second example embodiment, one player may play a game anonymously while another plays the game non-anonymously. Accordingly, a gaming server may facilitate a game involving a first client entity playing against a second client entity. The first client entity may be associated with a first non-anonymous alias and an anonymous alias, while the second client entity may be associated with a second non-anonymous alias.

Upon request of the first client entity, the gaming server may allow the first client entity to join an instance of the game using the anonymous alias. Upon request of the second client entity, the gaming server may allow the second client entity to join the instance of the game using the second non-anonymous alias. Thus, the first client entity plays anonymously, but the second client entity plays non-anonymously.

The gaming server may record events occurring in the instance of the game into a first history and a second history. Preferably the first history uses the first non-anonymous alias to represent the first client entity and the second non-anonymous alias to represent the second client entity, while the second history uses the anonymous alias to represent the first client entity and the second non-anonymous alias to represent the second client entity.

The gaming server may make at least part of the first history available to the first client entity, and make at least part of the second history available to the second client entity. Similarly to the first example embodiment, the first client entity is provided with events that record the first non-anonymous alias, but the second client entity is only provided with events that record the anonymous alias. In this way, the identity of the first client entity's anonymous player is protected.

In a third example embodiment, a gaming server conducts a game in which all players play anonymously. Preferably, these players include a first client entity that is associated with a first non-anonymous alias and a second client entity that is associated with a second non-anonymous alias. Upon request of the first client entity, the gaming server may allow the first client entity to join an instance of the game using a first anonymous alias, and upon request of the second client entity, the gaming server may allow the second client entity to join the instance of the game using a second anonymous alias. Thus, both the first client entity and the second client entity are preferably playing the instance of the game anonymously.

The gaming server may record events occurring in the instance of the game into a first history and a second history. The first history may use the first non-anonymous alias to represent the first client entity and the second anonymous alias to represent the second client entity. The second history may use the first anonymous alias to represent the first client entity and the second non-anonymous alias to represent the second client entity. Additionally, the gaming server may make at least part of the first history available to the first client entity and make at least part of the second history available to the second client entity.

Thus, the first client entity may be provided with events that record the first client entity's non-anonymous alias while recording the second client entity's anonymous alias. Analogously, the second client entity may be provided with events that record the first client entity's anonymous alias, while recording the second client entity's non-anonymous alias. In this way, both anonymous players' identities are protected.

These and other aspects and advantages will become apparent to those of ordinary skill in the art by reading the following detailed description, with reference where appropriate to the accompanying drawings. Further, it should be understood that the foregoing overview is merely for purposes of illustration and is not intended to limit the scope of the invention as claimed.

BRIEF DESCRIPTION OF THE DRAWINGS

FIG. 4A depicts a virtual table in an online gaming room, in accordance with an example embodiment;

FIG. 4B is a table representing gameplay history, in accordance with an example embodiment;

FIG. 4C is another table representing gameplay history, in accordance with an example embodiment;

FIG. 4D is yet another table representing gameplay history, in accordance with an example embodiment;

FIG. 4E is a first message flow diagram, in accordance with an example embodiment;

FIG. 4F is a second message flow diagram, in accordance with an example embodiment;

FIG. 5 is a third message flow diagram, in accordance with an example embodiment;

FIG. 6 is a flow chart, in accordance with an example embodiment;

FIG. 7 is a fourth message flow diagram, in accordance with an example embodiment;

FIG. 9 is a fifth message flow diagram, in accordance with an example embodiment; and FIG. 10 is yet another flow chart, in accordance with an example embodiment.

DETAILED DESCRIPTION

Figure 1:
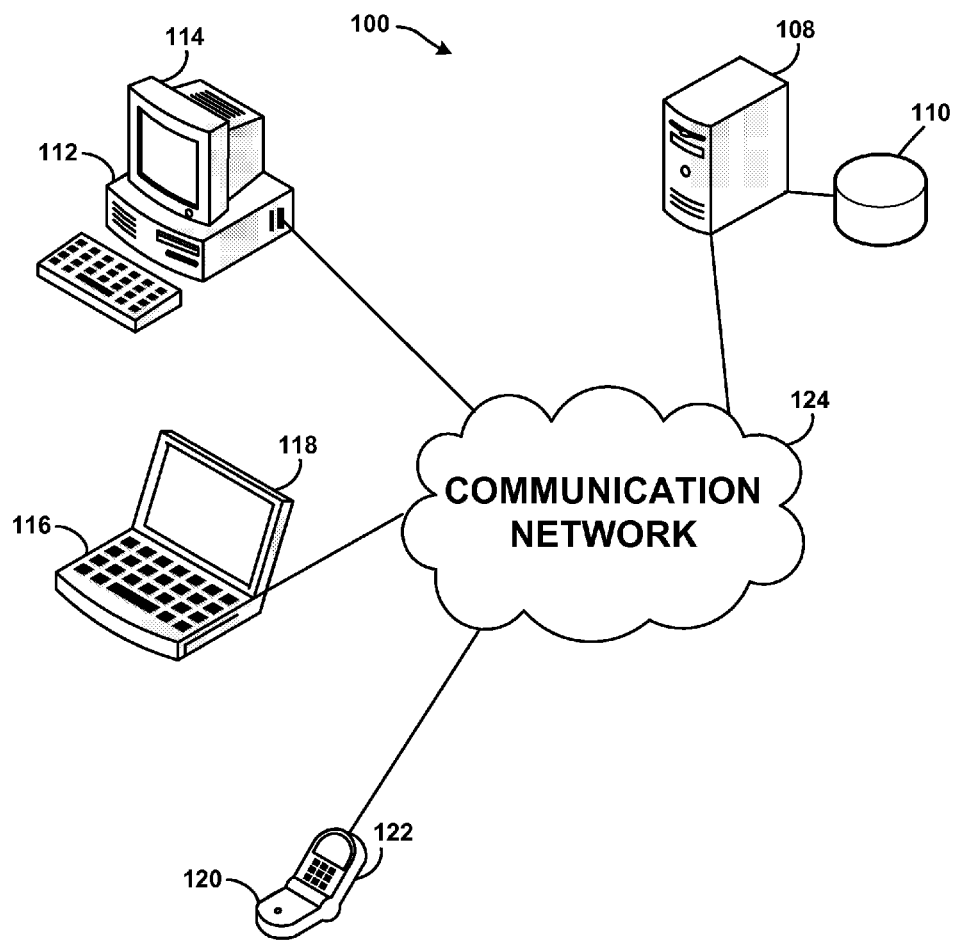
FIG. 1 is a diagram of a client/server networked computing system that may be used to facilitate play of a game, in accordance with an example embodiment.

Disclosed herein are methods and devices for providing anonymous games. A player may join an instance of a game anonymously, such that other players in the instance of the game may not be able to determine the player's actual identity. A gaming server may facilitate the instance of the game and, while doing so, represent the occurrence of gameplay events to at least some of the players in the instance of the game. The gaming server may also record these events for later retrieval and review. Preferably, the events are represented and recorded such that the player is able to observe most or all of the events that took place during to course of his or her gameplay, and that the player is represented by the player's non-anonymous alias in these events. However, if the same events are observed by another entity, this other entity will only be able to view the player's anonymous alias.

In this way, players can participate anonymously in online games, understanding that their previous gameplay will not be used against them. As a result, players may be more likely to participate in online games, and to play for longer periods of time when they do so. This, in turn may increase the popularity and profitability of online gaming providers.

I. GAME DESCRIPTIONS

The embodiments herein are disclosed in the context of online games. Popular examples of online games include multiplayer, multi-state card games, such as blackjack, baccarat, and poker. In particular, the descriptions below focus on poker in order to illustrate certain embodiments. Nonetheless, these embodiments are not limited to blackjack, baccarat, poker, or any other individual card game. Furthermore, these embodiments can be used with other types of online games, including but not limited to dice games, word games, strategy games, adventure games, and virtual-reality games.

While some of the embodiments herein are focused on multiplayer games, single-player games may also be within the scope of this invention. Additionally, multiplayer games may not require that all players play, or actively engage in, the game at the same time. For instance, some multiplayer games may involve one player playing the game first, then another player playing the game at a later point in time. The outcome of each player's gameplay can be compared during gameplay, or after all players have completed playing, in order to determine an outcome.

Moreover, a multi-state card game, may be one in which the state of a player's hand of cards may change through the course of the hand. For instance, the cards may be added to or removed from the player's hand according to the game's rules. Each time the cards in the player's hand or an opponent's hand changes, the state of the card game also changes. However, the state of the card game may change without the cards in any hand changing (e.g., cards may be drawn from a card supply and then discarded without being placed in a hand). Based on the state that the card game is in, the players may be offered various gameplay options.

It should be understood that the term "hand" is used for two purposes herein. A "hand" may refer to a series of gameplay events in a multiplayer card game, including cards being dealt, one or more rounds of wagering taking place, and then a player in the hand being determined to be the winner of the hand's pot. A "hand" may also refer to the cards dealt to a player, or used by a player, during the course of gameplay. Thus, a "hand" of cards may involve a number of individual players, and each of these players may have a "hand" of cards with which to play. The meaning of any instance of the term "hand" should be apparent from context, but if such meaning is not apparent, the term "hand" should be interpreted to have whichever meaning is the broadest and most inclusive.

Additionally, an "instance" of a game may define a particular virtual table or virtual room in which the game takes place. Alternatively, an instance of the game may define a particular number of hands of the game, or a particular time period over which the game is played.

These card games may use a standard playing card deck of fifty-two cards, divided into four suits. These four suits may be, for example, clubs, diamonds, hearts, and spades. Alternatively, some other type of suit may be used. Therefore, each suit may contain thirteen cards, ten of which are preferably labeled from 1 (ace) to 10, and three of which are preferably face cards, such as a jack, a queen, and a king. On the other hand, non-standard playing cards may be used as well without departing from the scope of the invention. Thus, there may be more or less than four suits and each suit may have more or less than thirteen cards. Additionally, multiple decks of fifty-two cards may be used as the supply of any cards drawn or dealt.

There are two major variations of poker: draw poker and stud poker. Both draw and stud poker have many possible variations, or alternative or optional ways to play, and such variations of these games may be provided by a particular house or enforced within a particular jurisdiction. Thus, any description of poker games herein is intended to be for purposes of illustration, and should not be construed as limiting. Accordingly, many different variations of poker may be played while remaining consistent with the embodiments herein.

Poker games are typically played for monetary gain. However, these games may be played for anything of value, including various forms of currency or credits, or just for fun. Thus, any reference to money, currency, or credits herein is also not intended to be limiting. With respect to the monetary gain that may be sought by players, preferably at least part of each wager made by a player is included in a "pot." A pot may be maintained separately for each instance of a hand, or may be combined in some fashion across multiple hands. Preferably, the winner of a given hand will receive some or all of the pot as his or her reward for winning.

In addition to wagers, players may also each contribute an ante to the pot. An ante is typically a token amount of money or value (e.g., one dollar) that each player provides before being dealt any cards. In some variations of poker, not all players are required to provide an ante. Instead, only a subset of the players at the table may take turns contributing an ante. However, not all players contributing an ante may contribute the same amount. Furthermore, in tournament play, antes may be progressive, in that they may increase over time as more hands are played.

TABLE 1

Example ranking of hands in poker.

| Hand | Description |
| --- | --- |
| Royal Flush | A straight flush consisting of a sequence of cards from ten through ace of the same suit. |
| Straight Flush | Five cards in sequence and of the same suit. |
| Four of a Kind | Four cards of the same rank. |
| Full House | Three cards of a first rank and two cards of a second rank. |
| Flush | Five cards of the same suit. |
| Straight | Five cards of any suit in sequence. |
| Three of a kind | Three cards of the same rank. |
| Two Pair | Two cards of a first rank and two cards of a second rank. |
| One Pair | Two cards of the same rank. |
| High Card | A single card of any suit. |

Table 1 provides an example ranking of poker hands. Higher hands in this ranking may beat lower hands in this ranking. Thus, for instance, a player with a straight will typically beat a player with three of a kind. Generally speaking, the more difficult a hand is to achieve, the higher its ranking. Accordingly, a royal flush, the most difficult hand to achieve in Table 1, beats all other hands. Conversely, one pair, a relatively easy-to-achieve hand, only beats a high card. When evaluating a player's hand against a table such as Table 1, preferably only the best possible (highest ranked) hand is considered. For example, a player who has three of a kind will not be considered to have the lower-ranked hand of two of a kind.

It should be understood that the hands listed in Table 1 are only for purposes of example. Accordingly, additional or different hand rankings could be used. Furthermore, some hands in Table 1 may be conditioned upon card suit or rank. For instance, the hand of one pair may only apply when the pair consists of a rank of jack or higher, or the hand of a royal flush may only apply when the five cards are all hearts. The rankings of Table 1 may be used with any of the embodiments described herein.

A. Draw Poker

In draw poker, each player is initially dealt a hand of five face-down cards from a fifty-two-card deck. Preferably, players maintain the secrecy of their respective hands until called upon to reveal their cards. After the deal completes, each player may be given an opportunity to wager on his or her hand. This wager may involve the player placing a bet that his or her cards will win the hand. Such a wager typically involves the player risking money or something of value on the outcome of the hand. Generally speaking, the wagering proceeds clockwise around a "table" until all players have had a chance to make a wager. Note that for online poker games, the table is a virtual construct and may not be related in any way to where the players are actually located.

The wagering may proceed as follows. When it is a given player's turn to wager, the given players' options depend on the state of the game. If no other player has yet placed a wager, the given player may wager a particular amount. This initial wagering amount may be required to fall within a range agreed upon by the players or determined by the house. For instance, a table may limit individual wagers to a minimum of two dollars and a maximum of two-hundred dollars. Once a player has wagered an amount, it goes into the pot.

Alternatively, the given player may "check" if he or she does not wish to place an initial wager. If another player has already placed a wager, the given player may either "call" and match the wager, "raise" and wager a higher amount than the current wager, or "fold," giving up the hand and losing any money or value wagered so far. The wagering continues around the table until all players have either called or folded, then the card replacement phase begins.

During this phase, each player may be each given an opportunity to replace one or more of the cards in their hand with undealt cards from the deck. In doing so, the players' goals are to improve the quality of their hand and to potentially achieve one of the winning hands in Table 1. Alternatively, a player may already have one of the winning hands in Table 1 (e.g., a pair), but may replace some of his or her cards in an attempt to achieve a better hand (e.g., three of a kind). After the card replacement phase concludes, another wagering round ensues. This second wagering round continues until, once again, all players have either called or folded. Alternatively, the second wagering round ends if there are no wagers and all players check. If more than one player has not folded after the second wagering round, these remaining players reveal their cards to one another, as well as to the rest of the players at the table and to any non-playing observers. The player with the highest rank hand according to Table 1 may win at least some of the pot.

B. Stud Poker

In stud poker, each player receives a mix of face-down and face-up cards that are dealt in multiple rounds. Each round may include a wagering phase similar to the wagering phases of draw poker. For instance, in seven-card stud, each player may be initially dealt two face-down and one face-up card, after which the first wagering round takes place. Then a second face-up card may be dealt to each player, and the second wagering round takes place. The second wagering round may be followed by each player being dealt a third face-up card and a third wagering round may take place, and then each player being dealt a fourth face-up card and a fourth wagering round may take place. Finally, each player is dealt a face-down card (for a total of seven cards dealt to each player), and a fifth wagering round may take place.

Naturally, if all players but one have folded during any wagering round, the hand is finished with the one remaining player winning the pot. In the case that two or more players remain in the game after the final wagering round, each of these players reveals his or her face-down cards, and each player's hand is determined to be the best five-card hand he or she can construct of the seven cards he or she was dealt. Based on these determinations, a winner may be chosen as the remaining player with the best hand.

C. Community-Card Poker

In recent years, community-card poker, such as Texas Hold 'Em, have become some of the most popular poker variations. For sake of simplicity, the gameplay of Texas Hold 'Em is described below as an example of community-card poker, but this description is not intended be limiting.

In Texas Hold 'Em, each player is initially dealt two face-down "hole" cards. After all players receive their hole cards, a first round of wagering takes place. The wagering process for each round may be similar to that of draw poker. Then, a total of five community cards are dealt face-up. These community cards are shared by all players, and one or more community cards may be combined with zero, one or two of a player's hole cards in order to form a five-card hand.

Typically, the community cards are dealt in three rounds, after each of which a subsequent wagering round takes place. The first round is called the "flop" and involves three community cards being dealt. Once the after-flop wagering completes, the second round, called "the turn," involves one additional community card being dealt. Once the after-turn wagering completes, the third round, called "the river," involves one final community card being dealt. Once the river card is dealt, a final round of wagering takes place. After this final round of wagering concludes, players may reveal their hole cards if required. The winner may be the player who can construct the best five-card hand out of any combination of his or her two hole cards and the five community cards.

II. GAME PLAYING ENVIRONMENTS

The embodiments of games described herein may be facilitated through the interconnection of computers and computer networks. The advantages of computerized gameplay include allowing the player to engage in the card games from the privacy of his or her own home, or via a mobile device from virtually anywhere.

FIG. 1 depicts an example of such a computerized arrangement. It should be understood, however, that this and other arrangements and processes described herein are set forth for purposes of example only, and other arrangements and elements (e.g., machines, interfaces, functions, orders of elements, etc.) can be added or used instead, and some elements may be omitted altogether. Further, as in most computer and communication architectures, those skilled in the art will appreciate that many of the elements described herein are functional entities that may be implemented as discrete components or in conjunction with other components, in any suitable combination and location. For example, systems and methods for facilitating the playing of games over a communication network are described in published PCT application WO 03/093921 A2, which is incorporated by reference herein in its entirety.

In FIG. 1, the system 100 includes the gaming server 108, the database 110, and the client entities 112, 116, and 120. Each client entity preferably includes or has access to a respective display 114, 118, and 122. The gaming server 108, the database 110, and the client entities 112, 116, and 120 may be capable of communicating with each other by means of the communication network 124. The communication network 124 may be a public Internet Protocol (IP) network such as the Internet, a private IP network, or a public or a private network that operates according to other communication protocols. Thus, the client entities 112, 116, and 120 may be, for example, personal computers, laptops, or wireless communication devices such as cell phones.

Furthermore, the communication network 124 may be purpose-built or hardcoded network designed for the support of networked games. For example, the gaming server 108 may be a mainframe computer and the client entities 112, 116, and 120 may be terminals that only communicate with the gaming server 108. Thus, the communication network 124 may only comprise communication links between the specific devices to which they connect. Alternatively, the gaming server 108, the database 110, and one or more of the client entities 112, 116, and 120, may be combined into a standalone gaming machine, such as a video game console.

The client entities 112, 116, and 120, the gaming server 108, and the database 110 may include various computing technologies, such as those that are semiconductor-based, magnetic, optical, acoustic, or biological in nature, any combination of these computing technologies, or any other technology known today or developed in the future, that can be used in conjunction with computational devices.

A networked game architecture may also be defined to comprise more or fewer elements. For example, the gaming server 108 and/or the database 110 may be distributed across more than one physical or logical device.

A. Gaming Server

The gaming server 108 may comprise a computing device with input, output, processing, storage, and memory functions. The gaming server 108 may be a form of personal computer, or may be physically designed for server operation. For example, the gaming server 108 may be a rack-mounted or blade server component. With respect to the depiction of the gaming server 108 in FIG. 1, the gaming server 108 may actually take the form of multiple physical components or computers that are co-located or distributed. For example, the gaming server 108 may be a cluster of computing devices that operate in conjunction with one another to enable networked games. This cluster may be in a particular physical location, such as an Internet service provider (ISP), or may operate over a network between multiple physical locations.

The gaming server 108 may run a standalone or distributed operating system to enable server functions. This operating system may be based on MICROSOFT WINDOWS®, MAC OS®, LINUX®, or various other technologies. These operating systems preferably support multiple processes or threads of execution so that a single gaming server 108 can support a potentially large number of games simultaneously. Additionally, the gaming server 108 may be provisioned with one or more network connections.

The gaming server 108 preferably operates under control of a server-stored program (not shown) capable of enabling the client entities 112, 116, and 120 to participate in one or more games. The stored program in the gaming server 108 may also maintain a dynamic register of all players admitted to, and actively participating in, a game, together with data representative of the corresponding card game.

Additionally, the gaming server 108 may contain, or have access to, accounts associated with each of these players. Thus, the gaming server 108 may add credits to or debit credits from these accounts in accordance with the game being played. Furthermore, the gaming server 108 may have an interface from which a given player may access his or her account in order to add more credits, or to cash out the account's credit balance. Moreover, the gaming server 108 may also have an administrative interface, from which an administrator of the gaming server 108 can add, delete, or modify accounts or game settings.

B. Database

The database 110 may be a device that provides storage for the gaming server 108, and may also be implemented in hardware, software, or a combination of hardware and software. The database 110 may be an actual database, such as a structured query language (SQL) database. Or, the database 110 may be a computer file or an arrangement of computer files in one or more file systems. Various types of data structures may store the information in such a database, including but not limited to tables, arrays, lists, trees, and tuples. Furthermore, the database may be monolithic or distributed across multiple devices in a network.

For instance, the database 110 may comprise one or more tables that contain the fields related to players that have registered to engage in gameplay on the gaming server 108. Additionally, the database 110 may also comprise one or more tables that record events occurring in one or more instances of a game played on the gaming server 108. These events may later be compiled into histories of gameplay that are made available to player that engaged in the instances of the game, or to other parties.

In one possible embodiment, the gaming server 108 is combined with the database 110. For example, the database 110 could be an SQL database or file(s) stored on gaming server 108. In another possible embodiment, the gaming server 108 and the database 110 are separate physical or logical devices. It should be understood that additional embodiments comprising the gaming server 108 and the database 110 are possible.

C. Client Entities

The client entities 112, 116, and 120 may comprise personal computers, computer terminals, laptop computers, wireless communication devices such as cell phones, personal digital assistants, or other types of computing devices. Furthermore, the client entities 112, 116, and 120 may operate under an operating system such as MICROSOFT WINDOWS®, MAC OS®, or LINUX®, and are preferably provisioned with a web browser and network connection.

Using the client entities 112, 116, and 120, networked card games may be facilitated by a client process (not shown) that executes one or more of the client entities 112, 116, and 120, and the server-stored program (not shown), or server process, that executes on the gaming server 108. In order to play a game from any client entity, a client process may first be downloaded, for example, from the gaming server 108 to one or more of the client entities 112, 116, and 120. The downloaded client process may then be installed in the one or more of the client entities 112, 116, and 120, where after it is ready for execution. Alternatively, the client process may execute from within a World Wide Web browser of a client entity. In either case, once the client process is launched, communication between client entity and the gaming server 108 may then proceed.

The output functions of the client entities 112, 116, and 120 may comprise a graphical user interface (GUI) rendered on the displays 114, 118, and 122. Such a GUI may represent networked game information in some combination of graphics and text. For example, a GUI on one or more of the displays 114, 118, and 122 may represent the state of a game associated with the display's respective client entity, and include options to perform the acts of playing the game. The client process executing on a client entity may display different trade marks, color schemes, or "look and feel" depending on the game being played.

Typically, a client entity is uniquely associated with a human player, or user. This player may employ the client entity to engage in gameplay, via the gaming server 108, with other human or computerized players. Alternatively, more than one user may share a single client entity, or a single user may employ more than one client entity while engaging in the gameplay. Some client entities may operate on behalf of one or more computerized players, or "robots." These robots may participate in the game algorithmically, according to pre-determined behaviors, and/or randomly.

D. Functional Model of Gaming Servers, Databases, and Client Entities

Figure 2:
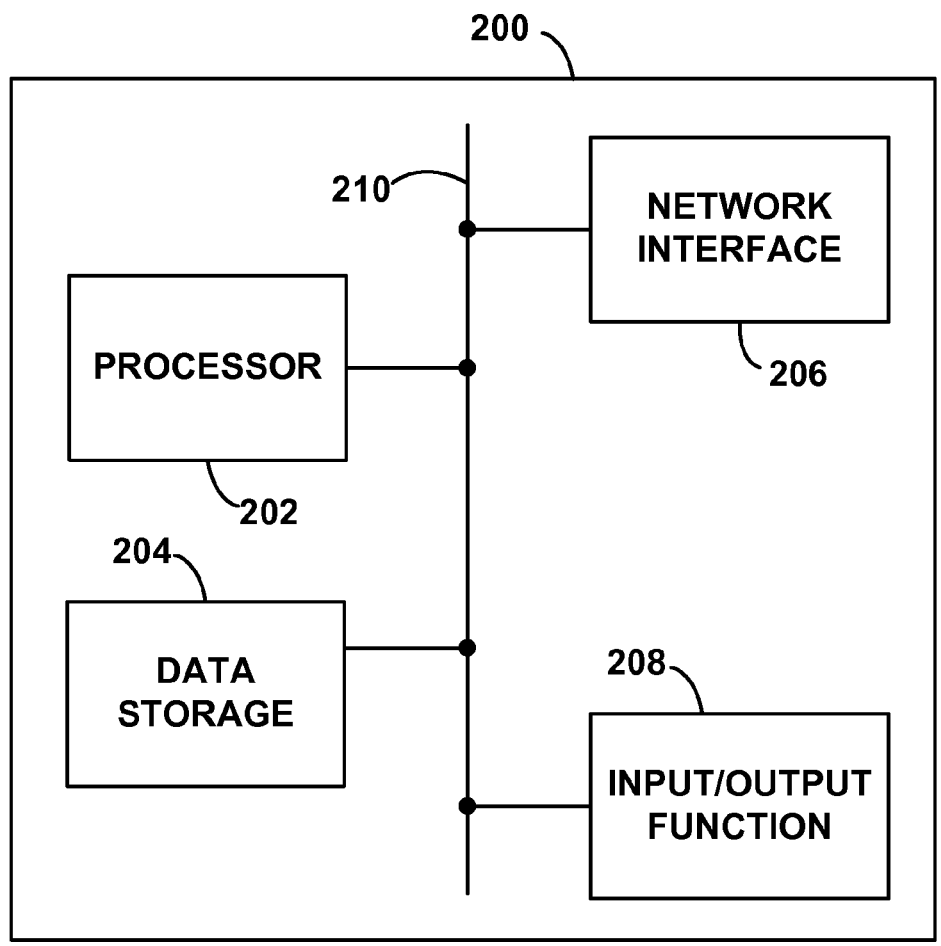
FIG. 2 is a block diagram of a computing device that may be used to execute part or all of a computerized game, in accordance with an example embodiment.

FIG. 2 is a simplified block diagram depicting an example representation of computing device 200. Gaming servers, such as the gaming server 108, databases, such as the database 110, and/or client entities, such as the client entities 112, 116, and 120, may be arranged according to such an example representation. FIG. 2 illustrates some of the functional components that would likely be found in a computing device that operates in accordance with the embodiments herein. The computing device 200 preferably includes a processor 202, data storage 204, a network interface 206, and an input/output function 208, all of which may be coupled by a system bus 210 or a similar mechanism.

The processor 202 preferably includes one or more central processing units (CPUs), such as one or more general purpose processors and/or one or more dedicated processors (e.g., application specific integrated circuits (ASICs) or digital signal processors (DSPs), etc.) The data storage 204, in turn, may comprise volatile and/or non-volatile memory and can be integrated in whole or in part with the processor 202. Alternatively, part or all of the data storage 204 may be external to the computing device 200, and thus may take the form of remote storage or network storage. The data storage 204 preferably holds program instructions executable by the processor 202, and data that is manipulated by these instructions, to carry out various functions described herein. Alternatively, the functions can be defined by hardware, firmware, and/or any combination of hardware, firmware and software.

By way of example, the data in the data storage 204 may contain information associated with performing any of the methods, processes, or functions described herein or represented by any of the accompanying figures. For example, the data storage 204 may contain data associated with the state of a game, data associated with a player's account, and so on. The data storage 204 may also contain program instructions that are executable by the processor 202 to perform any of the gaming server or client entity methods, processes, or functions presented herein or represented by any of the accompanying figures. Accordingly, the data storage 204 may include database functionality.

The network interface 206 may take the form of a wireline connection, such as an Ethernet, Token Ring, SONET, or T-carrier connection. The network interface 206 may alternatively or additionally take the form of a wireless connection, such as IEEE 802.11, BLUETOOTH®, CDMA, WIMAX®, UMTS®, LTE®, or any other interface used to communicate. However, other forms of physical layer connections and other types of standard or proprietary communication protocols may be used over the network interface 206. Furthermore, the network interface 206 may comprise multiple physical or logical network interfaces, each capable of operating according to the same or different protocols.

The input/output function 208 facilitates user interaction with the computing device 200. The input/output function 208 may comprise multiple types of input devices, such as a keyboard, a mouse, a touch screen, and so on. Similarly, the input/output function 208 may comprise multiple types of output devices, such as a screen, monitor, printer, or one or more light emitting diodes (LEDs). The displays 114, 118, and 122 may be considered either one of or both input and output functions of their respective client entities. Additionally or alternatively, the computing device 200 may support remote access from another device, via the network interface 206 or via another interface (not shown), such an RS-232 port.

III. EXAMPLE OPERATIONS

The following subsections describe example embodiments of operational characteristics in accordance with the scope of this invention. In particular, these subsections include (i) a description of the contents that may be stored in player accounts, (ii) an example of gameplay including how a gaming server may store the history of a game, and (iii) message flows and flow charts depicting steps or sequences of events that may occur on or between the gaming server and one or more client entities. Nonetheless, these example embodiments are not exhaustive, and many other embodiments not described herein may still fall within the scope of the invention.

A. Accounts

Figure 3:
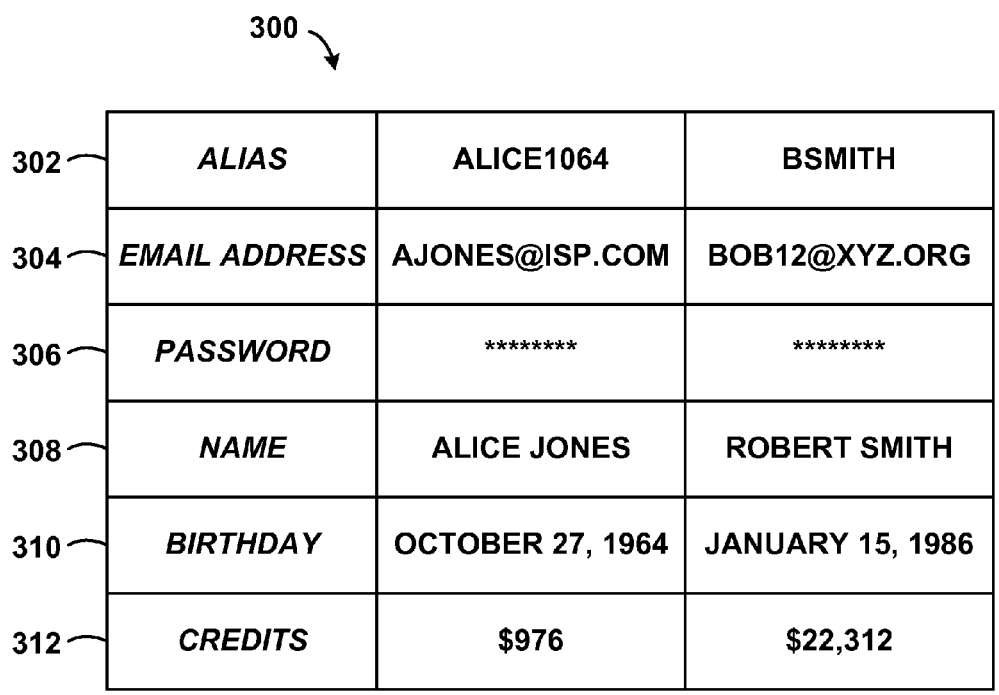
FIG. 3 is a table representing player accounts, in accordance with an example embodiment.

In order to facilitate gameplay, players may establish accounts. These accounts may be managed either by the house or a third party. Such an account may specify data associated with a player, including but not limited to an alias, an email address, a password, a name, a birthday, and an amount of credit. In FIG. 3, the table 300 depicts account data for two example players.

In the row 302, the players' aliases are specified. Preferably, an alias is a series of alphanumeric characters that uniquely identify a player. Players may use the alias like a userid with which to log on to the gaming server. Alternatively or additionally, the aliases may identify the players while the players are engaged in gameplay. For instance, while at a virtual table, the player with the alias of "ALICE1064" may be identified with a textual or graphical representation of ALICE1064. Similarly, the player with the alias of "BSMITH" may be identified with a textual or graphical representation of BSMITH.

The row 304 specifies the players' email addresses. Email addresses may also serve as userids for the players, thus enabling the players to log on to the gaming server. Additionally or alternatively, email addresses may serve as ways for the game provider to communicate with players. For instance, if player ALICE1064 loses his or her password, the gaming server may be able to transmit a new password to ALICE1064's email address, so that ALICE1064 can regain access to the gaming server.

The row 306 specifies the players' passwords. A password may be used in conjunction with a userid (e.g., an alias or an email address) to authenticate a player to the gaming server. In the table 300, both players' passwords are obscured to reflect that a gaming server may not store a player's actual password in plain text. Instead, the gaming server may store a hashed cipher text representation of the password. In this way, the security of the password is increased, as anyone viewing the table 300 will not be able to directly determine the password from the table.

The row 308 specifies the players' names. Preferably, the players provide their actual legal names. Accordingly, players may specify their given name, their surname, or both, as part of whole of their name as stored in the table 300. However, doing so is not required, and any appropriate information may be stored in the row 308.

The row 310 specifies the players' birthdays. Birthdays may be specified in any reasonable combination of year, month, and day, or just year and month or year. Storing each player's birthday may be useful, as some jurisdictions have limits on the age of players that can wager for items of value in online games. Additionally, knowledge of each player's birthday gives the game provider the ability to make special offers to players on their birthdays. For instance, on a player's birthday, the game provider may offer the player discounted gameplay or free credits.

The row 312 specifies the player's credits. These credits may be monetary in nature, or may be non-monetary. For example, a player's credits may consist of some quantity of dollars, euro, pounds, or yen. Alternatively, the player's credits may be based on some non-monetary currency, such as a virtual currency, or may take the form of non-monetary items of value. These latter types of credits may be able to be exchanged for monetary currency. Thus, the credits may represent play money and have no actual value, allowing players to enjoy the card game without risking actual financial loss.

The player may load his or her account with a number of credits, and may wager these credits on the outcome of games. The player may do so via cash payment, credit card, electronic funds transfer, or some other means.

B. Example Gameplay

In order to further describe and elucidate some possible embodiments of this invention, an example of gameplay is presented below. In particular, FIGS. 4A, 4B, 4C, and 4D provide an illustrative instance of a game of Texas Hold 'Em community-card poker. It should be understood that this illustrative example is not limiting and the scope and spirit of the invention encompasses any other type of game that can support anonymous play.

In FIG. 4A, virtual table 410 is a depiction of an example virtual table that may be used in an online poker room. A gaming server may be arranged transmit such a depiction to one or more client entities, for these client entities to display on their screens. Thus, the virtual table 410 may be represented on a GUI, and may incorporate various buttons, sliders, dials, check boxes, text boxes and status displays to assist a player in engaging in the poker game. For instance, in the upper right-hand corner of the virtual table 410, there is a button that, when pressed, allows the player to leave the table and thus end their engagement in the game. Further, in the lower right-hand corner of the virtual table 410, there is a chat box that reports game status and allows players to share information with one another. Moreover, in the upper left-hand corner of virtual table 410, a hand number of 12345 is provided. Preferably, this hand number serves to uniquely identify the hand, and may also serve as an index to information about hand 12345 that is stored by the gaming server. Gameplay typically progresses clockwise around such a virtual table.

Players ALICE1064, BSMITH, CYNDI, and BIGD may be arranged clockwise around the virtual table 410. Additionally, and not shown in the virtual table 410, anonymous or non-anonymous observers may also be present in the online poker room. Note that ALICE1064 and BIGD are represented by respective anonymous aliases of ANON6534 and ANON9101, so that their default aliases are hidden from their opponents as well as any observers. (For purposes of simplicity, the players in this example may from hereon be referred to by their default aliases.)

An anonymous alias may be chosen by the player who uses the anonymous alias, or chosen by the gaming server or another device. Preferably, an anonymous alias is randomly generated, at least in part. For instance, the gaming server may create an anonymous alias by appending a randomly-generated four-digit number at the end of the text string "ANON." Of course, more or fewer characters in an anonymous alias may be randomly generated, and text strings other than "ANON" may be used in anonymous aliases.

Preferably, these anonymous aliases do not readily identify ALICE1064 or BIGD. In other words, a player or observer in an online game in which ALICE1064 or BIGD are engaged would not be able to identify ALICE1064 or BIGD from their anonymous aliases of ANON6534 and ANON9101, respectively. Furthermore, the anonymous aliases may be temporary aliases, in that the anonymous aliases may be used for a limited number of instances of a game. For example, for each hand, ALICE1064 or BIGD may change their anonymous alias. On the other hand, ALICE1064 or BIGD may use the same anonymous alias for a number of hands. In this case, ALICE1064 or BIGD could use the same anonymous alias for the duration of their stay within a particular instance of the game, or the duration of their session with the gaming server.

With respect to the chat box, each piece of information, or message, shared by a player or observer, may identify the player or observer from which the message originated. Typically, the player or observer may be identified with his or her default, non-anonymous alias. However, if the player or observer is using an anonymous alias while present in the online poker room, the player or observer may be identified only by this anonymous alias, or not at all. Thus, an anonymous player may communicate with other players anonymously. To this point, in the chat box, ALICE1064 and BIGD are represented by their respective anonymous aliases. Alternatively, an anonymous player may be prevented from engaging in some or all types of communication with other players.

Furthermore, the gaming server may support "buddy lists" through which players can track the online presence of other players logged into the gaming server. Thus, for instance, ALICE1064 could subscribe to the presence of BSMITH, by adding BSMITH to his or her buddy list. Then, when BSMITH logs into the gaming server or joins an instance of a game facilitated by the gaming server, ALICE1064 may be able to determine that either BSMITH is logged on to the gaming server, BSMITH is in engaged in a particular instance of a game, or both. Among other things, this feature would allow players to be able to locate one another online so that they can play together in the same instances of the game. Nonetheless, a player who uses an anonymous alias may be omitted from any buddy lists and/or may not have his or her presence reported by the gaming server. In this way, an anonymous player may be effectively invisible to other players' buddy lists.

It should be understood that the virtual table 410 is presented merely for purposes of illustration. Thus, a virtual table in accordance with embodiments herein may contain more or less information than shown in FIG. 4A.

FIG. 4B represents a hand of Texas Hold 'Em poker. In this hand, ALICE1064, BSMITH, CYNDI, and BIGD compete with one another, with the results of each player's decisions stored in the recorded events 420. Each player may be engaging in the game via a gaming server, such as the gaming server 108. Furthermore, each player may be accessing the gaming server form a client entity, such as the client entities 112, 116, and 120.

In FIG. 4B, each player is associated with a default alias, and two players are associated with anonymous aliases. The first player has a default alias of ALICE1064, the second player has a default alias of BSMITH, the third player has a default alias of CYNDI, and the fourth player has a default alias of BIGD. These default aliases are preferably the same alias defined for each respective player in their respective accounts. For example, the accounts in the table 300 that refer to aliases ALICE1064 and BSMITH may, for purposes of this illustration, be considered to be the accounts of the first two players.

The progress of the game proceeds from the top to the bottom of the recorded events 420, with each row representing a state of the game. Thus, in the "hole card" state, the four players have been dealt two hole cards each. Preferably, these hole cards are dealt face down so that each player may see his or her own hole cards, but cannot readily see any of his or her opponents' hole cards. For sake of convenience and for purposes of illustration, all hole cards are shown face up in FIG. 4B. It should be understood that prior to at least some hole cards being dealt, players may partake in an initial wager or ante.

In FIG. 4B, as well as FIGS. 4C and 4D, each example card is represented in the format [rank][suit]. For cards that are not face cards or aces (i.e. 2-10), the card's rank is its numerical value. For face cards and aces, the card's rank is "J" for jack, "Q" for queen, "K" for king, and "A" for ace. A card's suit is represented as "C" for clubs, "D" for diamonds, "H" for hearts, or "S" for spades. Thus, ALICE1064 has the ace of spades and the king of hearts as hole cards, BSMITH has the seven of clubs and two of diamonds as hole cards, CYNDI has the four of hearts and the five of spades as hole cards, and BIGD has the eight of clubs and the nine of clubs as hole cards.

After the hole cards are dealt, the players may engage in wagering round one. Without loss of generality, assume that ALICE1064 checks. When a player checks, the player refrains from wagering in a situation in which the player is not obliged to wager. BSMITH then wagers one credit. CYNDI folds, and BIGD raises the one credit wager to a two credit wager. Preferably, the amount of each of these wagers, and all other wagers made by players in the game, are debited from the respective player's account. Of course, if a player's account has insufficient funds for placing a given wager, the player may be prevented from placing the given wager, or the game server may assume that the player wants to go "all in," betting all of his or her remaining credits.

In most variations of poker, when a player places a wager, the other players in the game must wager at least the amount of the highest wager in order to stay in the hand. If a player wagers the same amount as the highest wager, the player is said to call. If a player wagers more than the highest current wager, that player is said to raise.

Often, when players raise, they do so either because they believe that their hand has a reasonable chance of beating their opponents' hands, or because they are bluffing. A player bluffs when he or she makes a relatively risky wager, for instance wagering a large number of credits on a comparatively weak hand. The strategy behind a player's bluffing is to make opposing players believe that the bluffing player has a strong hand when the bluffing player actually has a relatively weaker hand.

Additionally, when a player folds, the player resigns from the hand and loses all of the credits that he or her has wagered so far in the hand. Typically, players fold when they believe that their hand is too weak to wager on given the totality of their standing in the game.

Thus, after BIGD raises the wager to two credits, ALICE1064 and BSMITH must either call or raise. As shown in FIG. 4B, both ALICE1064 and BSMITH call with cumulative wagers of two credits each. Preferably, ALICE1064 and BSMITH each add one additional credit to their previous wagers of one credit to reach this total wager of two credits. Note that since CYNDI has folded, CYNDI no longer is able to wager, and may be limited to observing the ongoing gameplay until the hand concludes. Alternatively, CYNDI may leave the virtual table after folding and may subsequently join another virtual table even before the hand concludes.

Once wagering round one is over, three community cards are dealt face up. These three cards may be referred to as the flop, and may be shared by all players. In other words, each player may add cards from the flop to his or her hole cards to form the best possible poker hands according to Table 1. In the example of FIG. 4B, the flop contains the nine of spades, the ten of diamonds, and the jack of hearts.

Thus, when combining the flop with their hole cards, the players may consider the following in the next round of wagering: ALICE1064 is one card (a queen) away from an ace-king-queen-jack-ten straight. BSMITH is also one card (an eight) away from a straight. However, BSMITH's potential straight of jack-ten-nine-eight-seven is weaker than ALICE1064's straight, because the rank of highest card in ALICE1064's straight is higher than the rank of the highest card in BSMITH's straight. Like ALICE1064 and BSMITH, BIGD has a potential straight, as BIGD has a jack, a ten, a nine and an eight, which could form a straight if any subsequently-dealt cards include a queen or a seven. However, BIGD also has a pair of nines. Again, it should be understood that while each player can see the cards in the flop and their own hole cards, they preferably cannot see the hole cards of their opponents. Thus, each player may not have access to all of the information shown in FIG. 4B.

Wagering round two starts with BIGD, who wagers five credits. Typically, the player to the left of the last player to call in the previous wagering round begins the wagering in the next wagering round. Thus, since BSMITH was the last player to call in wagering round one and CYNDI folded, BIGD may be the first player to wager in wagering round two. BIGD likely wagers five credits, rather than a lower amount, because he or she has a pair, and may be able to achieve a straight. ALICE1064 and BSMITH both call this five-credit wager, as they both may be able to achieve a straight as well.

Once wagering round two is over, another community card, the turn, is dealt face up. In this example of FIG. 4B, the turn is the seven of hearts. The remaining players, ALICE1064, BSMITH, and BIGD, may then combine the turn with the flop and their respective hole cards to form the best five-card poker hand possible out of their six available cards.

Wagering round three begins with BIGD raising another five credits. ALICE1064 calls this raise, but BSMITH folds. Thus, after wagering round three, only ALICE1064 and BIGD remain in the game.

Once wagering round three is over, a final community card, the river, is dealt face up. In the example of FIG. 4B, the river is the ace of hearts. ALICE1064 and BIGD may then combine the river, the turn, the flop and their respective hole cards to form the best five-card poker hand possible out of their seven available cards.

At this state of the game, ALICE1064 has a pair of aces, which is a relatively strong hand. However, BIGD has a jack-ten-nine-eight-seven straight, which is a more powerful hand. Since both players may believe that it is likely that they have the better hand, they both may continue wagering.

Thus, BIGD wagers ten credits, and ALICE1064 responds by raising BIGD by five credits for a total wager of fifteen credits. BIGD then calls.

After the wagering round four, the remaining players may engage in a showdown. In other words, ALICE1064 and BIGD reveal their hole cards and compare hands. Since BIGD's straight is ranked higher in Table 1 than ALICE1064's pair of aces, BIGD wins the hand and the pot. The total number of credits in the pot may include wagers made by all players over the course of the four wagering rounds. Thus, ALICE1064 wagered a total of twenty-seven credits, BSMITH wagered a total of seven credits, CYNDI wagered a total of zero credits, and BIGD wagered a total of twenty-seven credits. Thus, BIGD wins a pot of sixty-one credits. Preferably, BIGD's account is credited by at least part of this amount.

It should be understood that a pot may include an initial ante that is not shown in FIG. 4B. Additionally, other variations of poker may be played. For instance, variations of poker with a different number of wagering rounds, a different arrangement of community cards, or without community cards altogether, may be played.

C. Management of Recorded Events and Gameplay History

In addition to recording events occurring during the course of gameplay, the gaming server may also store these recorded events for later retrieval. For example, the information in the recorded events 420 may be stored at the gaming server that facilitated the game, or at a database associated with the gaming server. These recorded events may be later retrieved by any of the players that participated in the game, in order to review their gameplay. Additionally, the provider of the game may also later retrieve this data in order to better understand how their games are being played. Preferably, the recorded events are stored so that the default alias of a player who played anonymously in an instance of a game cannot be readily ascertained by other players or third parties who view the recorded events.

To that end, FIG. 4C provides the recorded events 430, which may be a version of the recorded events 420 that are for viewing by ALICE1064. The recorded events 430 contain mostly the same information as the recorded events 420, except that the recorded events 430 do not reveal BIGD's default alias or any unrevealed hole cards. Thus, BIGD is represented by the anonymous alias ANON9101, and the hole cards of BSMITH and CYNDI, who both folded, are omitted from the recorded events 430. Nonetheless, ALICE1064 may have access to the recorded events 430, so that ALICE1064 can analyze his or her gameplay, possibly to improve his or her strategies and winnings.

Similarly, FIG. 4D provides the recorded events 440, which may be a version of the recorded events 420 that are for viewing by BSMITH. The recorded events 440 may also contain mostly the same information as the recorded events 420, except that the recorded events 440 do not reveal ALICE1064's default alias or BIGD's default alias. Additionally, the recorded events 440 do not reveal any unrevealed hole cards, aside from the hole cards of BIGD. Thus, ALICE1064 is represented by the anonymous alias ANON6534, BIGD is represented by the anonymous alias ANON9101, and the hole cards of CYNDI, who folded, are omitted from recorded events 440. Nonetheless, like how ALICE1064 may access and use the recorded events 430, BSMITH may have access to the recorded events 440 so that BSMITH can analyze his or her gameplay, possibly to improve his or her strategies and winnings.

In order to provide more than one version of the recorded events 420, a gaming server may store the recorded events 420 and then derive, from the recorded events 420, other versions of recorded events. Alternatively, the gaming server may store several different versions of recorded events 420, each version tailored to one or more potential requesters.

FIG. 4E is an example message flow 450 illustrating how the recorded events 430 and the recorded events 440 could be derived from the recorded events 420. In message flow 450 the gaming server 108 may store the recorded events 420. It should be understood that the gaming server 108 does not have to store the recorded events 420 locally. The recorded events 420 could alternatively be stored on another device and made accessible to the gaming server 108.

At step 452, ALICE1064 may transmit a request for recorded events from hand 12345 played on the gaming server 108. At step 454, in response to this request, the gaming server 108 may validate that ALICE1064 can access the recorded events 430. This validation step may involve the gaming server 108 authenticating the credentials of ALICE1064 (e.g., ALICE1064's default alias and password), and verifying that ALICE participated in hand 12345.

Once ALICE1064 is verified, the gaming server 108 may derive the recorded events 430 from the recorded events 420. Preferably, this derivation involves the gaming server 108 copying events from the recorded events 420 that ALICE1064 is permitted to access. This may include substantially all events that ALICE1064 could have observed during the gameplay of hand 12345. For instance, any hole cards of other players in hand 12345 that were not revealed during hand 12345 may not be copied into the recorded events 430. Additionally, the default alias of any player who played using an anonymous alias also may not be copied into the recorded events 430. Once the recorded events 430 are prepared, at step 456 the gaming server 108 may transmit the recorded events 430 to ALICE1064.

At step 458, BSMITH may transmit a request for recorded events from hand 12345. At step 460, similarly to how the gaming server 108 validated ALICE1064, the gaming server 108 may validate that BSMITH can access the recorded events 440. Once BSMITH is verified, the gaming server 108 may derive the recorded events 440 from the recorded events 420. The recorded events 440 may include substantially all events that BSMITH could have observed during the gameplay of hand 12345. Once the recorded events 440 are prepared, at step 462, the gaming server 108 may transmit the recorded events 440 to BSMITH.

FIG. 4F is another example message flow 470 illustrating how the gaming server 108 could allow retrieval of the recorded events 430 and the recorded events 440. In full generality, the gaming server 108 may record the events of hand 12345 into at least one set of recorded events for each player in hand 12345. The advantages of doing so include not having one set of recorded events storing a complete history of the hand, where this complete history may include information to which some players should not have access.

Thus, at step 472, ALICE1064 may transmit a request for recorded events for hand 12345 played on the gaming server 108. At step 474, in response to this request, the gaming server 108 may validate that ALICE1064 can access the recorded events 430. This validation step, may involve the gaming server 108 authenticating the credentials of ALICE1064 (e.g., ALICE1064's default alias and password), verifying that ALICE participated in hand 12345, and identifying the recorded events 430. Once ALICE1064 is verified, the gaming server 108 may locate the recorded events 430, and at step 476, the gaming server 108 may transmit the recorded events 430 to ALICE1064.

Similarly, at step 478, BSMITH may transmit a request for recorded events from hand 12345 played on the gaming server 108. At step 480, in response to this request, the gaming server 108 may validate that BSMITH can access the recorded events 440. This validation step, may involve the gaming server 108 authenticating the credentials of BSMITH, verifying that BSMITH participated in hand 12345, and identifying the recorded events 440. Once BSMITH is verified, the gaming server 108 may locate the recorded events 440, and at step 482, the gaming server 108 may transmit the recorded events 440 to BSMITH.

Although FIGS. 4E and 4F involve players requesting recorded events from a gaming server, such a request may be made to a different device instead. For instance, a gaming server may store the recorded events on a database operating on a different physical or logical device. Thus, the player may request the recorded events from or via that different physical or logical device. Also, while FIGS. 4E and 4F show requests coming from players ALICE1064 and BSMITH, these requests may instead originate from respective client entities associated with each of these players. Alternatively or additionally, other entities may request versions of the recorded events from the gaming server.

D. Message Flows and Flow Charts

Figure 8:
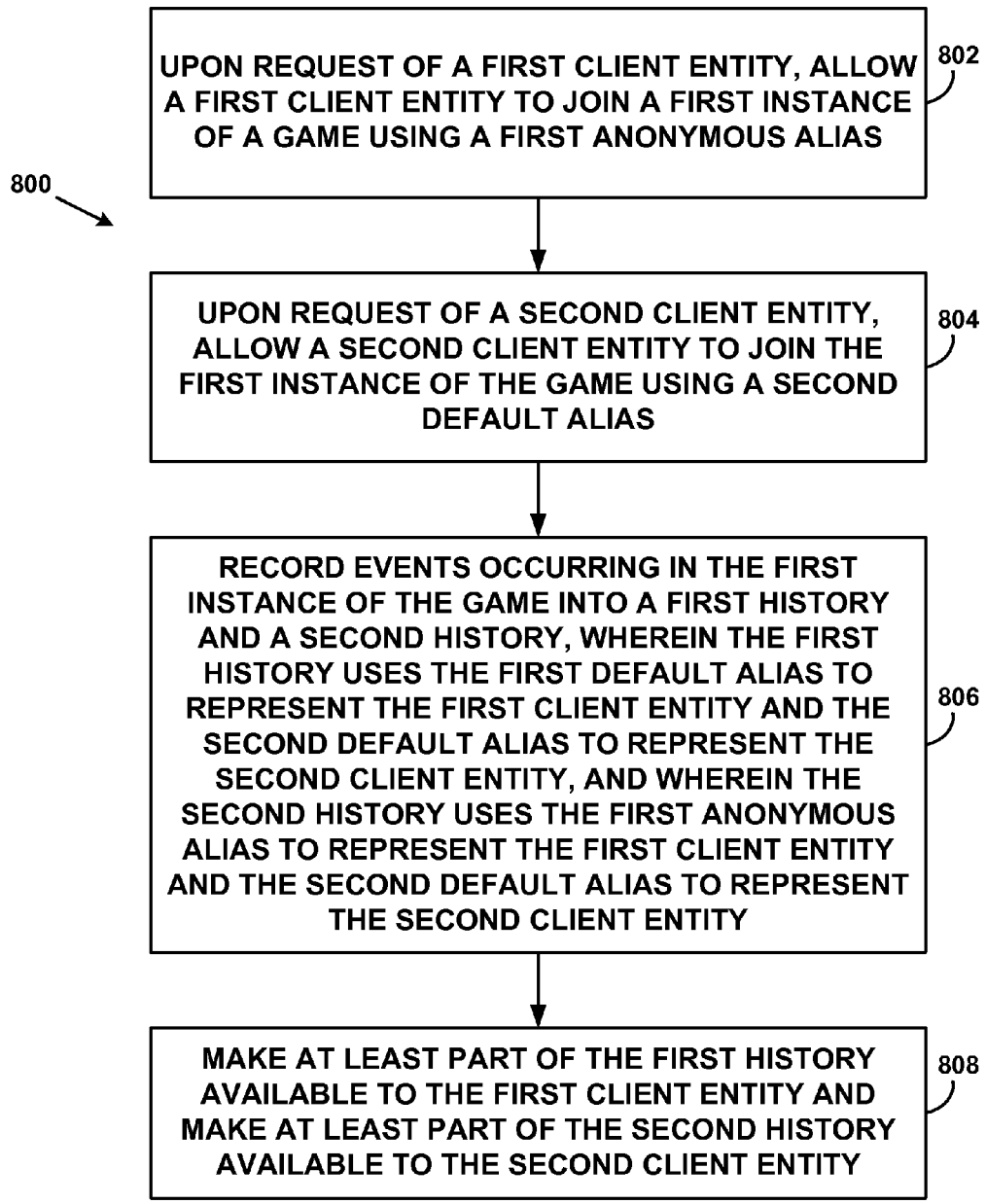
FIG. 8 is another flow chart, in accordance with an example embodiment.

FIGS. 5-10 are message flow diagrams and flow charts of methods in accordance with example embodiments of this invention. Each of these figures represent, in one way or another, means through which one or more client entities can anonymously engage in a game. In particular, FIGS. 5 and 6 may represent a single client entity anonymously engaging in a game. Other players in this game may be either anonymous or non-anonymous. FIGS. 7 and 8 may represent one client entity anonymously engaging in a game, while another client entity engages in the game non-anonymously. FIGS. 9 and 10 may represent two client entities, each anonymously engaging in a game.

In all of the scenarios depicted in FIGS. 5-10, a gaming server may facilitate play of the game. In particular, the gaming server may represent anonymous client entities to other players in the game in such a way that these anonymous client entities cannot readily be identified. On the other hand, non-anonymous client entities may be represented in such a way that they may be able to be readily identified by other players in the game.

It should be understood that each of the methods illustrated by these figures may include more or fewer steps. Furthermore, the steps of any two or more of these message flow diagrams and flow charts can be combined with one another, in whole or in part, without departing from the scope of the embodiments herein.

FIG. 5 is a message flow 500 involving communication between the gaming server 108 and the client entity 112. A player, who is assigned a first alias, may use the client entity 112 to engage in a game on the gaming server 108. This first alias is preferably a non-anonymous default alias.

At step 502, the client entity 112 may transmit a request for access to the gaming server 108. This request may include the first alias, and the first alias may represent the client entity 112 seeking to log in to the gaming server 108 in order to play the game. Once the client entity 112 is logged in to the gaming server 108, the client entity 112 may, at step 504, request to join an instance of the game using a second alias. Preferably, the second alias is an anonymous alias.

At step 506, in response to receiving the request of step 504, the gaming server 108 may include the client entity 112 in an instance of the game. Such inclusion may involve, for example, the client entity 112 being permitted to join a virtual table and engage in a game at that virtual table. Accordingly, at step 508, the gaming server 108 may transmit a representation of the first alias to client entity 112, wherein the first alias is used to represent the player at client entity 112. However, at step 510, the gaming server 108 may represent the player at client entity 112 to other client entities using the second alias. In this way, the player at client entity 112 is able to view his or her non-anonymous alias, but other players may only be able to view the player's anonymous alias.

Additionally, at step 512, the gaming server 108 may record a set of events occurring in the instance of the game. This set of events may be similar to those represented in FIGS. 4A, 4B, 4C, and 4D, or may comprise larger or smaller sets of the same type or different types of events.

FIG. 6 is a flow chart 600 of steps that a gaming server, such as the gaming server 108, may take to facilitate scenarios similar to that of the message flow 500. In particular, the gaming server may have access to an account, from which a player is capable of engaging in games via the gaming server. The account may be associated with a first alias, and the first alias is preferably a non-anonymous alias.

At step 602, the gaming server may allow a client entity using the first alias to access the gaming server. Thus, using the first alias, a player may log into the gaming server from the client entity. At step 604, the gaming server may receive a first request from the client entity to join a first instance of a game hosted by the gaming server and to use a second alias during the first instance of the game. Preferably, the second alias is an anonymous alias. At step 606, in response to receiving the first request, the gaming server may include the client entity in the first instance of the game.

At step 608, during play of the first instance of the game, the gaming server may use the first alias to represent the account to the client entity. On the other hand, the gaming server may also use the second alias to represent the account to other client entities involved in the first instance of the game. In this way, the anonymity of the player using the client entity can be established and maintained.

At step 610, the gaming server may record a first set of events occurring during the first instance of the game. Preferably, the recorded events in the first set represent the client entity using both the first alias and the second alias. However, the recorded events in the first set may also comprise aliases of other players who participated in the first instance of the game, wagers made by players in the first instance of the game, and an outcome of the first instance of the game. The recorded events may be stored in a database, and the database may comprise a first table containing the aliases, a second table containing the outcome, and a third table containing the wagers.

In addition to the steps shown in flow chart 600, the gaming server may provide a first subset of the first set of recorded events to the other client entities, where the client entity is represented by the second alias in recorded events of the first subset. The gaming server may also provide a second subset of the first set of recorded events to the client entity, where the client entity is represented by the first alias in recorded events of the second subset. In doing so, the gaming server may provide a version of the first set of recorded events using the player's non-anonymous alias to the player, and a version of the first set of recorded events using the player's anonymous alias to other players.

In order to enable gameplay between the gaming server and the client entity, the gaming server may be coupled to the client entity used by the player, as well as to any other client entities used by other players, via a communication network. Accordingly, the gaming server may receive requests from client entities via the communication network. Further, the gaming server may transmit one or more representations of the first alias to the client entity via the communication network, and may also transmit one or more representations of the second alias to the other client entities via the communication network.

In addition to the player engaging in gameplay anonymously, other players in the same games may also engage in anonymous gameplay. Thus, any of the other client entities may be associated with a respective anonymous alias. Therefore, during play of the first instance of the game, the gaming server may use the respective anonymous aliases to represent each of the other client entities to the player's client entity. In this way, other players engaged in the game may also establish and maintain their anonymity. However, the gaming server may also support other instances of the game that do not allow participating client entities to use anonymous aliases. Thus, the gaming server may provide virtual rooms and/or virtual tables that support anonymous gameplay, as well as virtual rooms and/or virtual tables that do not support anonymous gameplay.

Furthermore, the gaming server may allow client entities to subscribe to presence of aliases. By default, the gaming server may mark a given alias as present when a given account associated with the given alias is accessing the gaming server. Correspondingly, the gaming server may mark the given alias as not present when the given account associated with the given alias is not accessing the gaming server. Thus, in order to protect the anonymity of players using anonymous aliases, if the gaming server determines that a player is accessing the gaming server with an anonymous alias, the gaming server may mark the player's default alias as not present. In this way, if a player chooses to access the gaming server or join an instance of a game anonymously, their presence will not be reported to anyone who has the player's default alias in their buddy list or has otherwise subscribed to the presence of the player's default alias.

A gaming server may also allow a player to, via a client entity, use additional anonymous aliases. In other words, the player may use one anonymous alias for a period of time, and then use another anonymous alias. The player may be able to use different anonymous aliases in different instances of a game played on the gaming server, even if these different instances are played simultaneously.

Thus, the gaming server may receive a second request from the client entity to join a second instance of a game hosted by the gaming server. The client entity may seek to use a third alias during the second instance of the game. Preferably, the third alias is anonymous. In response to receiving the second request, the gaming server may include the client entity in the second instance of the game. Then, during play of the second instance of the game, the gaming server may use the first alias to represent the account to the client entity, and use the third alias to represent the account to other client entities involved in the second instance of the game.

Additionally, the gaming server may record a second set of events occurring during the second instance of the game. Preferably, the recorded events in the second set represent the client entity using both the first alias and the third alias. The gaming server may provide a first subset of the second set of recorded events, in which the client entity is represented by the third alias, to the other client entities. The gaming server may also provide a second subset of the second set of recorded events, in which the client entity is represented by the first alias, to the client entity.

FIG. 7 is provides a message flow 700 to illustrate two client entities joining the same instance of a game on a gaming server, where one of the client entities uses an anonymous alias and the other client entity uses a non-anonymous alias. Thus, a client entity 112 may be associated with a first default alias, while a client entity 116 may be associated with a second default alias. Preferably, both default aliases are non-anonymous. At step 702, the client entity 112 may transmit, to the gaming server 108, a request to join an instance of a game, and to use a first anonymous alias in this instance of the game. Similarly, at step 704, the client entity 116 may transmit, to the gaming server 108, a request to join the same instance of the game, and to use the second default alias in the instance of the game.

At step 706, the gaming server 108 may record events, occurring in the instance of the game, to a first history. Preferably, while doing so the gaming server 108 uses the first default alias to represent the client entity 112 and the second default alias to represent the client entity 116. In this way, both client entities are represented by their non-anonymous aliases in the first history. Also, at step 708, the gaming server 108 may record events occurring in the instance of the game to a second history. Preferably, while doing so, the gaming server 108 uses the first anonymous alias to represent the client entity 112 and the second default alias to represent the client entity 116.

Then, at step 710, the gaming server 108 may transmit the first history to the client entity 112, and at step 712, the gaming server 108 may transmit the second history to the client entity 116. Thus, the client entity 112 receives a version of the recorded events that identifies the client entity 112 with its non-anonymous alias, while client entity 116 receives a version of the recorded events that identifies client entity 112 with its anonymous alias. In this way, the anonymity of client entity 112 may be protected.

FIG. 8 is a flow chart 800 of steps that a gaming server, such as gaming server 108, may take to facilitate scenarios similar to that of the message flow 700. In particular, the gaming server may have access to accounts associated with a first client entity and a second client entity. Preferably, the first client entity's account contains a first default alias for the first client entity, and the second client entity's account contains a second default alias for the second client entity. The gaming server may allow the first client entity and the second client entity to compete with one another in an instance of a game, such as a multi-state card game or a poker game.

Accordingly, at step 802, upon request of the first client entity, the gaming server may allow the first client entity to join a first instance of the game using a first anonymous alias. Preferably, the first anonymous alias does not identify the account or the player associated with the first client entity. Similarly, at step 804, upon request of the second client entity, the gaming server may allow the second client entity to join the first instance of the game using the second default alias. Preferably, the second default alias does identify the account of the second client entity.

At step 806, the gaming server may record events occurring in the first instance of the game into a first history and a second history. Preferably, the first history uses the first default alias to represent the first client entity and the second default alias to represent the second client entity. Additionally, the second history may use the first anonymous alias to represent the first client entity and the second default alias to represent the second client entity. Then, at step 808, the gaming server may make at least part of the first history available to the first client entity, and may also make at least part of the second history available to the second client entity.

The first history and the second history may be stored separately or in a common database. Further, the recorded events in the first history may comprise the first default alias, the second default alias, wagers made by players in the first instance of the game, and an outcome of the first instance of the game. Moreover, the recorded events in the second history may comprise the first anonymous alias, the second default alias, the wagers, and the outcome. Additionally or alternatively, the recorded events in the first history and the recorded events in the second history may be stored in database tables. These database tables may comprise a first table containing the aliases, a second table containing the wagers, and a third table containing the outcome.

Furthermore, the gaming server may allow client entities to subscribe to presence of aliases on the gaming server. For instance, by default, the gaming server may mark a given alias as present when a given account associated with the given alias is accessing the gaming server. However, the gaming server may mark the given alias as not present when the given account associated with the given alias is not accessing the gaming server. Then, if the gaming server determines that the first client entity is accessing the gaming server and using the first anonymous alias, the gaming server may mark the first default alias as not present.

Other than supporting the first instance of the game, which allows players to join anonymously and non-anonymously, the gaming server may support a second instance of the game. The second instance of the game may not allow participating client entities to use anonymous aliases. On the other hand, the second instance of the game may allow, or require, participating client entities to use anonymous aliases.

Thus, for example, upon request of the first client entity, the gaming server may allow the first client entity to join a second instance of the game using the first anonymous alias. Similarly, upon request of the second client entity, the gaming server may allow the second client entity to join the second instance of the game using a second anonymous alias. Then, the gaming server may record events occurring in the second instance of the game into a third history and a fourth history. The third history may use the first default alias to represent the first client entity, and the second anonymous alias to represent the second client entity. However, the fourth history may use the first anonymous alias to represent the first client entity and the second default alias to represent the second client entity. After recording at least part of the third and fourth histories, the gaming server may make at least part of the third history available to the first client entity, and may also make at least part of the fourth history available to the second client entity.

It should be understood that the gaming server may be coupled to the first client entity via a communication network. Thus, the gaming server may receive the requests from the first and second client entities via the communication network, may transmit a representation of the first default alias to the first client entity via the communication network, and may transmit a representation of the first anonymous alias to the second client entity via the communication network.

FIG. 9 provides message flow 900 to illustrate two client entities joining the same instance of a game on a gaming server, where both of the client entities use anonymous aliases. Thus, a client entity 112 may be associated with a first default alias, while a client entity 116 may be associated with a second default alias. At step 902, the client entity 112 may transmit, to the gaming server 108, a request to join an instance of a game, and to use a first anonymous alias in this instance of the game. Similarly, at step 904, the client entity 116 may transmit, to the gaming server 108, a request to join the same instance of the game, and to use a second anonymous alias in the instance of the game.

At step 906, the gaming server 108 may record events occurring in the instance of the game to a first history. Preferably, while doing so, the gaming server 108 uses the first default alias to represent the client entity 112 and the second anonymous alias to represent client entity 116. In this way, the anonymity of the client entity 116 is protected in the first history. At step 908, the gaming server 108 may record events occurring in the instance of the game to a second history. Preferably, while doing so, the gaming server 108 uses the first anonymous alias to represent the client entity 112 and the second default alias to represent the client entity 116. In this way, the anonymity of the client entity 112 is protected in the second history.

Then, at step 910, the gaming server 108 may transmit the first history to the client entity 112, and at step 912, the gaming server 108 may transmit the second history to the client entity 116. Thus, the client entity 112 receives a version of the recorded events that identifies the client entity 112 with its non-anonymous alias and identifies the client entity 116 with its anonymous alias. Conversely, the client entity 116 receives a version of the recorded events that identifies the client entity 112 with its anonymous alias and identifies the client entity 116 with its non-anonymous alias.

FIG. 10 is a flow chart 1000 of steps that a gaming server, such as gaming server 108, may take to facilitate scenarios similar to that of message flow 900. In particular, the gaming server may have access to accounts associated with a first client entity and a second client entity. Preferably, the first client entity's account contains a first default alias for the first client entity, and the second client entity's account contains a second default alias for the second client entity. The gaming server may allow the first client entity and the second client entity to compete with one another in an instance of a game, such as a multi-state card game or a poker game.

Accordingly, at step 1002, upon request of the first client entity, the gaming server may allow the first client entity to join a first instance of the game using a first anonymous alias. Preferably, the first anonymous alias does not identify the account of the first client entity. Similarly, at step 1004, upon request of the second client entity, the gaming server may allow the second client entity to join the first instance of the game using the second anonymous alias. Preferably, the second anonymous alias does not identify the account of the second client entity.

At step 1006, the gaming server may record events occurring in the first instance of the game into a first history and a second history. Preferably, the first history uses the first default alias to represent the first client entity and the second anonymous alias to represent the second client entity. Additionally, the second history may use the first anonymous alias to represent the first client entity and the second default alias to represent the second client entity. Then, at step 1008, the gaming server may make at least part of the first history available to the first client entity, and may also make at least part of the second history available to the second client entity.

The first history and the second history may be stored separately or in a common database. Further, the recorded events in the first history may comprise the first default alias, the second anonymous alias, wagers made by players in the first instance of the game, and an outcome of the first instance of the game. Moreover, the recorded events in the second history may comprise the first anonymous alias, the second default alias, the wagers, and the outcome. Additionally or alternatively, the recorded events in the first history and the recorded events in the second history may be stored in database tables. These database tables may comprise a first table containing the aliases, a second table containing the wagers, and a third table containing the outcome.

Furthermore, the gaming server may allow client entities to subscribe to presence of aliases on the gaming server. For instance, by default, the gaming server may mark a given alias as present when a given account associated with the given alias is accessing the gaming server. However, the gaming server may mark the given alias as not present when the given account associated with the given alias is not accessing the gaming server. Then, if the gaming server determines that the first client entity is accessing the gaming server and using the first anonymous alias, the gaming server may mark the first default alias as not present. Similarly, if the gaming server determines that the second client entity is accessing the gaming server and using the second anonymous alias, the gaming server may mark the second default alias as not present.

In an anonymous game supported by the gaming server, an arbitrary number of players and/or observers may be supported. Thus, for example, upon request of a third client entity that is associated with a third default alias, the gaming server may allow the third client entity to join the instance of the game, and use a third anonymous alias. The gaming server may also record the events occurring in the instance of the game into a third history. Preferably, the third history uses first anonymous alias to represent the first client entity, the second anonymous alias to represent the second client entity, and the third default alias to represent the third client entity. Additionally, the first history and the second history may use the third anonymous alias to represent the third client entity. Then, the gaming server may make at least part of the third history available to the third client entity.

It should be understood that the gaming server may be coupled to the first client entity via a communication network. Thus, the gaming server may receive the request from the first client entity via the communication network, may transmit a representation of the first default alias to the first client entity via the communication network, and may transmit a representation of the first anonymous alias to the second client entity via the communication network. Similarly, the gaming server may receive the request from the second client entity via the communication network, may transmit a representation of the second default alias to the second client entity via the communication network, and may transmit a representation of the second anonymous alias to the first client entity via the communication network.

IV. ADDITIONAL DESCRIPTION

Methods and devices are presented for facilitating anonymous gameplay in multi-state, multiplayer games, such as poker. A gaming server may allow players to anonymously join instances of a game. The gaming server may represent an anonymous player to himself or herself using a non-anonymous alias, while the gaming server may represent the anonymous player to the other players or entities using an anonymous alias. Additionally, the gaming server may record events occurring in the game, and provide similarly anonymized versions of these events to other players and entities.

The following clauses are offered as further description of the disclosed invention.

(1) A method, performed by a gaming server, wherein a account capable of engaging in games is associated with a first alias, the method comprising the gaming server allowing a client entity using the first alias to access the gaming server;

the gaming server receiving a first request from the client entity to join a first instance of a game hosted by the gaming server and to use a second alias during the first instance of the game;

in response to receiving the first request, the gaming server including the client entity in the first instance of the game;

during play of the first instance of the game, the gaming server using the first alias to represent the account to the client entity, while using the second alias to represent the account to other client entities involved in the first instance of the game; and the gaming server recording a first set of events occurring during the first instance of the game, wherein the recorded events in the first set represent the client entity using both the first alias and the second alias.

(2) The method of clause (1), further comprising:

the gaming server providing a first subset of the first set of recorded events to the other client entities, wherein the client entity is represented by the second alias in the first subset of the first set of recorded events.

(3) The method of clause (2), further comprising:

the gaming server providing a second subset of the first set of recorded events to the client entity, wherein the client entity is represented by the first alias in the second subset of the first set of recorded events.

(4) The method of any preceding clause, wherein the game comprises a multi-state card game.

(5) The method of clause (4), wherein the game comprises a poker game.

(6) The method of any preceding clause, wherein the gaming server is coupled to the client entity and the other client entities via a communication network, and wherein the gaming server using the first alias to represent the account to the client entity comprises the gaming server transmitting a representation of the first alias to the client entity via the communication network, and wherein the gaming server using the second alias to represent the account to the other client entities comprises the gaming server transmitting a representation of the second alias to the other client entities via the communication network.

(7) The method of any preceding clause, wherein the first alias is a default alias that identifies the account and the second alias is an anonymous alias that does not identify the account.

(8) The method of any preceding clause, wherein each of the other client entities is associated with a respective anonymous alias, the method further comprising:

during play of the first instance of the game, the gaming server using the respective anonymous aliases to represent each of the other client entities to the client entity.

(9) The method of any preceding clause, wherein the gaming server supports a second instance of the game and the second instance of the game does not allow participating client entities to use anonymous aliases.

(10) The method of any preceding clause, wherein the gaming server allows client entities to subscribe to presence of aliases on the gaming server, wherein, by default, a given alias is marked present when a given account associated with the given alias is accessing the gaming server, and the given alias is marked not present when the given account associated with the given alias is not accessing the gaming server, the method further comprising:

the gaming server determining that the account is accessing the gaming server and using the second alias; and in response to the determination, the gaming server marking the first alias as not present.

(11) The method of any preceding clause, further comprising:

the gaming server receiving a second request from the client entity to join a second instance of a game hosted by the gaming server and to use a third alias during the second instance of the game;

in response to receiving the second request, the gaming server including the client entity in the second instance of the game;

during play of the second instance of the game, the gaming server using the first alias to represent the account to the client entity, while using the third alias to represent the account to other client entities involved in the second instance of the game; and the gaming server recording a second set of events occurring during the second instance of the game, wherein the recorded events in the second set represent the client entity using both the first alias and the third alias.

(12) The method of clause (11), further comprising:

the gaming server providing, to the other client entities, a first subset of the second set of recorded events in which the client entity is represented by the third alias; and the gaming server providing, to the client entity, a second subset of the second set of recorded events in which the client entity is represented by the third alias.

(13) The method of any preceding clause, wherein the recorded events in the first set comprise aliases that participated in the first instance of the game and an outcome of the first instance of the game.

(14) The method of clause (13), wherein the recorded events in the first set also comprise wagers made by players in the first instance of the game.

(15) The method of clause (14), wherein the recorded events in the first set are stored in a database, wherein the database comprises a first table containing the aliases, a second table containing the outcome, and a third table containing the wagers.

(16) A method, performed by a gaming server that conducts a game involving a first client entity playing against a second client entity, wherein the first client entity is associated with a first default alias and the second client entity is associated with a second default alias, the method comprising:

upon request of the first client entity, the gaming server allowing the first client entity to join a first instance of the game, wherein the first client entity uses a first anonymous alias in the first instance of the game;

upon request of the second client entity, the gaming server allowing the second client entity to join the first instance of the game, wherein the second client entity uses the second default alias in the first instance of the game;

the gaming server recording events occurring in the first instance of the game into a first history and a second history, wherein the first history uses the first default alias to represent the first client entity and the second default alias to represent the second client entity, and wherein the second history uses the first anonymous alias to represent the first client entity and the second default alias to represent the second client entity; and the gaming server making at least part of the first history available to the first client entity and making at least part of the second history available to the second client entity.

(17) The method of clause (16), wherein the game comprises a multi-state card game.

(18) The method of clause (17), wherein the game comprises a poker game.

(19) The method of any of clauses (16)-(18), wherein the gaming server is coupled to the first client entity via a communication network, and wherein the first client entity using the first anonymous alias comprises, during play of the first instance of the game, the gaming server transmitting a representation of the first default alias to the first client entity via the communication network, and the gaming server transmitting a representation of the first anonymous alias to the second client entity via the communication network.

(20) The method of any of clauses (16)-(19), wherein the first default alias identifies a account associated with the first client entity, and the first anonymous alias does not identify the account.

(21) The method of any of clauses (16)-(20), wherein the gaming server supports a second instance of the game and the second instance of the game does not allow participating client entities to use anonymous aliases.

(22) The method of any of clauses (16)-(21), wherein the gaming server allows client entities to subscribe to presence of aliases on the gaming server, wherein, by default, a given alias is marked present when a given account associated with the given alias is accessing the gaming server, and the given alias is marked not present when the given account associated with the given alias is not accessing the gaming server, the method further comprising:

the gaming server determining that the first client entity is accessing the gaming server and using the first anonymous alias; and in response to the determination, the gaming server marking the first default alias as not present.

(23) The method of any of clauses (16)-(22), further comprising:

upon request of the first client entity, the gaming server allowing the first client entity to join a second instance of the game, wherein the first client entity uses the first anonymous alias in the second instance of the game;

upon request of the second client entity, the gaming server allowing the second client entity to join the second instance of the game, wherein the second client entity uses a second anonymous alias in the second instance of the game; the gaming server recording events occurring in the second instance of the game into a third history and a fourth history, wherein the third history uses the first default alias to represent the first client entity and the second anonymous alias to represent the second client entity, and wherein the fourth history uses the first anonymous alias to represent the first client entity and the second default alias to represent the second client entity; and the gaming server making at least part of the third history available to the first client entity and making at least part of the fourth history available to the second client entity.

(24) The method of any of clauses (16)-(23), wherein the first history and the second history are stored in a common database.

(25) The method of any of clauses (16)-(24), wherein the recorded events in the first history comprise the first default alias, the second default alias, wagers made by players in the first instance of the game, and an outcome of the first instance of the game.

(26) The method of clause (25), wherein the recorded events in the second history comprise the first anonymous alias, the second default alias, the wagers, and the outcome.

(27) The method of clause (26), wherein the recorded events in the first history and the recorded events in the second history are stored in database tables, wherein the database tables comprise a first table containing the first anonymous alias and the second default alias, a second table containing the wagers, and a third table containing the outcome.

(28) A method, performed by a gaming server that conducts a game, wherein all players in the game play anonymously, wherein the players include a first client entity that is associated with a first default alias and a second client entity that is associated with a second default alias, the method comprising:

upon request of the first client entity, the gaming server allowing the first client entity to join an instance of the game, wherein the first client entity uses a first anonymous alias in the instance of the game;

upon request of the second client entity, the gaming server allowing the second client entity to join the instance of the game, wherein the second client entity uses a second anonymous alias in the instance of the game;

the gaming server recording events occurring in the instance of the game into a first history and a second history, wherein the first history uses the first default alias to represent the first client entity and the second anonymous alias to represent the second client entity, and wherein the second history uses the first anonymous alias to represent the first client entity and the second default alias to represent the second client entity; and the gaming server making at least part of the first history available to the first client entity and making at least part of the second history available to the second client entity.

(29) The method of clause (28), wherein the players also include a third client entity that is associated with a third default alias, the method further comprising:

upon request of the third client entity, the gaming server allowing the third client entity to join the instance of the game using a third anonymous alias, wherein the third client entity uses a third anonymous alias in the instance of the game;

the gaming server also recording the events occurring in the instance of the game into a third history, wherein the third history uses first anonymous alias to represent the first client entity, the second anonymous alias to represent the second client entity, and the third default alias to represent the third client entity, and wherein the first history and the second history use the third anonymous alias to represent the third client entity; and the gaming server making at least part of the third history available to the third client entity.

(30) The method of any of clauses (28)-(29), wherein the game comprises a multi-state card game.

(31) The method of clause (30), wherein the game comprises a poker game.

(32) The method of any of clauses (28)-(31), wherein the gaming server is coupled to the first client entity via a communication network, and wherein the first client entity using the first anonymous alias comprises, during play of the instance of the game, the gaming server transmitting a representation of the first default alias to the first client entity via the communication network, and the gaming server transmitting a representation of the first anonymous alias to the second client entity via the communication network.

(33) The method of any of clauses (28)-(32), wherein the first default alias identifies a first account associated with the first client entity, and the first anonymous alias does not identify the first account, and wherein the second default alias identifies a second account associated with the second client entity, and the second anonymous alias does not identify the second account.

(34) The method of any of clauses (28)-(33), wherein the gaming server allows client entities to subscribe to presence of aliases on the gaming server, wherein, by default, a given alias is marked present when a given account associated with the given alias is accessing the gaming server, and the given alias is marked not present when the given account associated with the given alias is not accessing the gaming server, the method further comprising:

the gaming server determining that the first client entity is accessing the gaming server and using the first anonymous alias; and in response to the determination, the gaming server marking the first default alias as not present.

(35) The method of any of clauses (28)-(34), wherein the first history and the second history are stored in a common database.

(36) The method of any of clauses (28)-(35), wherein the recorded events in the first history comprise the first default alias, the second anonymous alias, wagers made by players in the instance of the game, and an outcome of the instance of the game.

(37) The method of clause (36), wherein the recorded events in the second history comprise the first anonymous alias, the second default alias, the wagers, and the outcome.

(38) The method of any of clauses (36)-(37), wherein the recorded events in the first history and the recorded events in the second history are stored in database tables, wherein the database tables comprise a first table containing the first anonymous alias and the second anonymous alias, a second table containing the wagers, and a third table containing the outcome.

(39) A gaming server, wherein an account capable of engaging in games conducted by the gaming server is associated with a first alias, the gaming server comprising:

a processor;

a data storage; and program instructions, stored in the data storage and executable by the processor, to (i) allow a client entity using the first alias to access the gaming server, (ii) receive a first request from the client entity to join a first instance of a game hosted by the gaming server and to use a second alias during the first instance of the game, (iii) in response to receiving the first request, include the client entity in the first instance of the game, (iv) during play of the first instance of the game, use the first alias to represent the account to the client entity, while using the second alias to represent the account to other client entities involved in the first instance of the game, and (v) record a first set of events occurring during the first instance of the game, wherein the recorded events in the first set represent the client entity using both the first alias and the second alias.

(40) The gaming server of clause (39), further comprising:
program instructions, stored in the data storage and executable by the processor, to provide a first subset of the first set of recorded events to the other client entities, wherein the client entity is represented by the second alias in the first subset of the first set of recorded events.

(41) The gaming server of clause (40), further comprising:
program instructions, stored in the data storage and executable by the processor, to provide a second subset of the first set of recorded events to the client entity, wherein the client entity is represented by the first alias in the second subset of the first set of recorded events.

(42) The gaming server of any of clauses (39)-(41), wherein the game comprises a multi-state card game.

(43) The gaming server of any of clauses (39)-(42), wherein the game comprises a poker game.

(44) The gaming server of any of clauses (39)-(43), further comprising:
an interface coupling the gaming server to the client entity and the other devices via a communication network, wherein the gaming server using the first alias to represent the account to the client entity comprises the gaming server transmitting a representation of the first alias to the client entity via the communication network, and wherein the gaming server using the second alias to represent the account to the other client entities comprises the gaming server transmitting a representation of the second alias to the other client entities via the communication network.

(45) The gaming server of any of clauses (39)-(44), wherein the first alias is a default alias that identifies the account and the second alias is an anonymous alias that does not identify the account.

(46) The gaming server of any of clauses (39)-(45), wherein each of the other client entities is associated with a respective anonymous alias, the gaming server further comprising:
program instructions, stored in the data storage and executable by the processor, to, during play of the first instance of the game, use the respective anonymous alias to represent each of the other client entities to the client entity.

(47) The gaming server of any of clauses (39)-(46), wherein the gaming server supports a second instance of the game and the second instance of the game does not allow participating client entities to use anonymous aliases.

(48) The gaming server of any of clauses (39)-(47), wherein the gaming server allows client entities to subscribe to presence of aliases on the gaming server, wherein, by default, a given alias is marked present when a given account associated with the given alias is accessing the gaming server, and the given alias is marked not present when the given account associated with the given alias is not accessing the gaming server, the gaming server further comprising:
program instructions, stored in the data storage and executable by the processor, to (i) determine that the account is accessing the gaming server and using the second alias, and (ii) in response to the determination, mark the first alias as not present.

(49) The gaming server of any of clauses (39)-(48), further comprising:
program instructions, stored in the data storage and executable by the processor, to (i) receive a second request from the client entity to join a second instance of a game hosted by the gaming server and to use a third alias during the second instance of the game, (ii) in response to receiving the second request, include the client entity in the second instance of the game, (iii) during play of the second instance of the game, use the first alias to represent the account to the client entity, while using the third alias to represent the account to other client entities involved in the second instance of the game, and (iv) record a second set of events occurring during the second instance of the game, wherein the recorded events in the second set represent the client entity using both the first alias and the third alias.

(50) The gaming server of any of clauses (39)-(49), further comprising:
program instructions, stored in the data storage and executable by the processor, to (i) provide a first subset of the second set of recorded events, in which the client entity is represented by the third alias, to the other client entities, and (ii) provide a second subset of the second set of recorded events, in which the client entity is represented by the first alias, to the client entity.

(51) The gaming server of any of clauses (39)-(50), wherein the recorded events in the first set comprise aliases that participated in the first instance of the game and an outcome of the first instance of the game.

(52) The gaming server of clause (51), wherein the recorded events in the first set also comprise wagers made by players in the first instance of the game.

(53) The gaming server of clause (52), further comprising:
a database that stores the recorded events in the first set, wherein the database comprises a first table containing the aliases, a second table containing the outcome, and a third table containing the wagers.

(54) A gaming server that conducts a game involving a first client entity playing against a second client entity, wherein the first client entity is associated with a first default alias and the second client entity is associated with a second default alias, the gaming server comprising:
a processor;
a data storage; and
program instructions, stored in the data storage and executable by the processor, to (i) upon request of the first client entity, allow the first client entity to join a first instance of the game, wherein the first client entity uses a first anonymous alias in the first instance of the game, (ii) upon request of the second client entity, allow the second client entity to join the first instance of the game, wherein the second client entity uses the second default alias in the first instance of the game, (iii) record events occurring in the first instance of the game into a first history and a second history, wherein the first history uses the first default alias to represent the first client entity and the second default alias to represent the second client entity, and wherein the second history uses the first anonymous alias to represent the first client entity and the second default alias to represent the second client entity, and (iv) make at least part of the first history available to the first client entity and making at least part of the second history available to the second client entity.

(55) The gaming server of clause (54), wherein the game comprises a multi-state card game.

(56) The gaming server of clause (55), wherein the game comprises a poker game.

(57) The gaming server of any of clauses (54)-(56), further comprising:
an interface coupling the gaming server to the first client entity via a communication network, wherein the first client entity using the first anonymous alias comprises, during play of the first instance of the game, the gaming server transmitting a representation of the first default alias to the first client entity via the communication network, and the gaming server transmitting a representation of the first anonymous alias to the second client entity via the communication network.

(58) The gaming server of any of clauses (54)-(57), wherein the first default alias identifies a account associated with the first client entity, and the first anonymous alias does not identify the account.

(59) The gaming server of any of clauses (54)-(58), wherein the gaming server supports a second instance of the game and the second instance of the game does not allow participating client entities to use anonymous aliases.

(60) The gaming server of any of clauses (54)-(59), wherein the gaming server allows client entities to subscribe to presence of aliases on the gaming server, wherein, by default, a given alias is marked present when a given account associated with the given alias is accessing the gaming server, and the given alias is marked not present when the given account associated with the given alias is not accessing the gaming server, the gaming server further comprising:

program instructions, stored in the data storage and executable by the processor, to (i) determine that the first client entity is accessing the gaming server and using the first anonymous alias, and (ii) in response to the determination, mark the first default alias as not present.

(61) The gaming server of any of clauses (54)-(60), further comprising:

program instructions, stored in the data storage and executable by the processor, to (i) upon request of the first client entity, allow the first client entity to join a second instance of the game, wherein the first client entity uses the first anonymous alias in the second instance of the game, (ii) upon request of the second client entity, allow the second client entity to join the second instance of the game, wherein the second client entity uses a second anonymous alias in the second instance of the game, (iii) record events occurring in the first instance of the game into a third history and a fourth history, wherein the third history uses the first default alias to represent the first client entity and the second anonymous alias to represent the second client entity, and wherein the fourth history uses the first anonymous alias to represent the first client entity and the second default alias to represent the second client entity, and (iv) make at least part of the third history available to the first client entity and making at least part of the fourth history available to the second client entity.

(62) The gaming server of any of clauses (54)-(61), wherein the first history and the second history are stored in a common database.

(63) The gaming server of any of clauses (54)-(62), wherein the recorded events in the first history comprise the first default alias, the second default alias, wagers made by players in the first instance of the game, and an outcome of the first instance of the game.

(64) The gaming server of clause (63), wherein the recorded events in the second history comprise the first anonymous alias, the second default alias, the wagers, and the outcome.

(65) The gaming server of clause (64), further comprising:

a database that stores the recorded events in the first history and the recorded events in the second history in database tables, wherein the database tables comprise a first table containing the first anonymous alias and the second default alias, a second table containing the wagers, and a third table containing the outcome.

(66) A gaming server that conducts a game, wherein all players in the game play anonymously, wherein the players include a first client entity that is associated with a first default alias and a second client entity that is associated with a second default alias, the gaming server comprising:

a processor;

a data storage; and program instructions, stored in the data storage and executable by the processor, to (i) upon request of the first client entity, allow the first client entity to join an instance of the game, wherein the first client entity uses a first anonymous alias in the instance of the game, (ii) upon request of the second client entity, allow the second client entity to join the instance of the game, wherein the second client entity uses a second anonymous alias in the instance of the game, (iii) record events occurring in the instance of the game into a first history and a second history, wherein the first history uses the first default alias to represent the first client entity and the second anonymous alias to represent the second client entity, and wherein the second history uses the first anonymous alias to represent the first client entity and the second default alias to represent the second client entity, and (iv) make at least part of the first history available to the first client entity and making at least part of the second history available to the second client entity.

(67) The gaming server of clause (66), wherein the players also include a third client entity that is associated with a third default alias, the gaming server further comprising:

program instructions, stored in the data storage and executable by the processor, to (i) upon request of the third client entity, allow the third client entity to join the instance of the game, wherein the third client entity uses a third anonymous alias in the instance of the game, (ii) also record the events occurring in the instance of the game into a third history, wherein the third history uses first anonymous alias to represent the first client entity, the second anonymous alias to represent the second client entity, and the third default alias to represent the third client entity, and wherein the first history and the second history use the third anonymous alias to represent the third client entity, and (iii) make at least part of the third history available to the third client entity.

(68) The gaming server of any of clauses (66)-(67), wherein the game comprises a multi-state card game.

(69) The gaming server of any of clauses (66)-(68), wherein the game comprises a poker game.

(70) The gaming server of any of clauses (66)-(69), further comprising:

an interface coupling the gaming server to the first client entity via a communication network, and wherein the first client entity using the first anonymous alias comprises, during play of the instance of the game, the gaming server transmitting a representation of the first default alias to the first client entity via the communication network, and the gaming server transmitting a representation of the first anonymous alias to the second client entity via the communication network.

(71) The gaming server of any of clauses (66)-(70), wherein the first default alias identifies a first account associated with the first client entity, and the first anonymous alias does not identify the first account, and wherein the second default alias identifies a second account associated with the second client entity, and the second anonymous alias does not identify the second account.

(72) The gaming server of any of clauses (66)-(71), wherein the gaming server allows client entities to subscribe to presence of aliases on the gaming server, wherein, by default, a given alias is marked present when a given account associated with the given alias is accessing the gaming server, and the given alias is marked not present when the given account associated with the given alias is not accessing the gaming server, the gaming server further comprising:

program instructions, stored in the data storage and executable by the processor, to (i) determine that the first client entity is accessing the gaming server and using the first anonymous alias, and (ii) in response to the determination, mark the first default alias as not present.

(73) The method of any of clauses (66)-(72), wherein the first history and the second history are stored in a common database.

(74) The gaming server of any of clauses (66)-(73), wherein the recorded events in the first history comprise the first default alias, the second anonymous alias, wagers made by players in the instance of the game, and an outcome of the instance of the game.

(75) The gaming server of clause (74), wherein the recorded events in the second history comprise the first anonymous alias, the second default alias, the wagers, and the outcome.

(76) The gaming server of clause (75), further comprising:

a database that stores the recorded events in the first history and the recorded events in the second history in database tables, wherein the database tables comprise a first table containing the first anonymous alias and the second anonymous alias, a second table containing the wagers, and a third table containing the outcome.

IV. CONCLUSION

For the embodiments described herein, the terms "random" or "randomly" shall refer to any realizable process of randomly generating events. Such processes shall include, but not be limited to, generating events without a deterministic pattern of occurrences. Additionally, these processes may be pseudo-random, thus resulting in a deterministic pattern of occurrences that exhibit some form of statistical randomness.

It should also be understood that use of any form of enumeration within an element of any of the claims should not be construed to imply that an ordering of events within the claim is required.

Furthermore, other variations from the disclosed embodiments may be made without departure from the scope of the invention. All questions concerning scope are to be answered by reference to the appended claims.

I claim:

1. A method, performed by a gaming server, wherein an account is associated with a first alias, the method comprising:

the gaming server allowing a client entity using the first alias to access the gaming server;

the gaming server receiving a first request from the client entity to join a first instance of a game hosted by the gaming server and to use a second alias during the first instance of the game, wherein the first alias is a default alias that identifies the account and the second alias is an anonymous alias that does not identify the account;

in response to receiving the first request, the gaming server including the client entity in the first instance of the game;

during play of the first instance of the game, the gaming server using the first alias to represent the account to the client entity, while using the second alias to represent the account to all other non-server entities involved in the first instance of the game;

the gaming server recording a first set of events occurring during the first instance of the game, wherein the recorded events in the first set represent the account with both the first alias and the second alias;

the gaming server determining that the client entity has won the first instance of the game; and after completion of the first instance of the game, the gaming server providing a first version of the first set of events to all of the other non-server entities involved in the first instance of the game, wherein the first version of the first set of events uses the second alias to represent the account and, wherein the gaming server does not reveal the first alias to any of the other non-server entities.

2. The method of claim 1, further comprising:

after completion of the first instance of the game, the gaming server providing a second version of the first set of events to the client entity, wherein the second version of the first set of events uses the first alias to represent the account.

3. The method of claim 1, wherein the game comprises a multi-state card game.

4. The method of claim 3, wherein the game comprises a poker game.

5. The method of claim 1, wherein the gaming server is coupled to the client entity and the other non-server entities via a communication network, and wherein the gaming server using the first alias to represent the account to the client entity comprises the gaming server transmitting a representation of the first alias to the client entity via the communication network, and wherein the gaming server using the second alias to represent the account to all of the other non-server entities comprises the gaming server transmitting a representation of the second alias to the other non-server entities via the communication network.

6. The method of claim 1, wherein each of the other non-server entities is associated with a respective anonymous alias, the method further comprising:

during play of the first instance of the game, the gaming server using the respective anonymous aliases to represent each of the other non-server entities to the client entity.

7. The method of claim 1, wherein the gaming server supports a second instance of the game in the form of a virtual table, provided by the gaming server, that does not allow participating client entities to use anonymous aliases.

8. The method of claim 1, wherein the gaming server allows client entities to subscribe to presence of aliases on the gaming server, wherein, by default, a given alias is marked present when a given client entity associated with the given alias is accessing the gaming server, and the given alias is marked not present when the given client entity associated with the given alias is not accessing the gaming server, the method further comprising:

the gaming server determining that the client entity is accessing the gaming server and using the second alias; and in response to the determination, the gaming server marking the first alias as not present, such that presence of the first alias is not reported to other entities that have subscribed to the presence of the first alias.

9. The method of claim 1, further comprising:

the gaming server receiving a second request from the client entity to join a second instance of a game hosted by the gaming server and to use a third alias during the second instance of the game;

in response to receiving the second request, the gaming server including the client entity in the second instance of the game;

during play of the second instance of the game, the gaming server using the first alias to represent the account to the client entity, while using the third alias to represent the account to other client entities involved in the second instance of the game; and the gaming server recording a second set of events occurring during the second instance of the game, wherein the recorded events in the second set represent the account with both the first alias and the third alias.

10. The method of claim 9, further comprising:

the gaming server providing, to the other client entities, a first subset of the second set of recorded events in which the account is represented by the third alias; and the gaming server providing, to the client entity, a second subset of the second set of recorded events in which the account is represented by the third alias.

11. The method of claim 1, wherein the recorded events in the first set comprise aliases that participated in the first instance of the game and an outcome of the first instance of the game.

12. The method of claim 11, wherein the recorded events in the first set also comprise wagers made by players in the first instance of the game.

13. The method of claim 12, wherein the recorded events in the first set are stored in a database, wherein the database comprises a first table containing the aliases, a second table containing the outcome, and a third table containing the wagers.

14. A method, performed by a gaming server that conducts a game involving a first client entity playing against a second client entity, wherein the first client entity is associated with a first default alias and the second client entity is associated with a second default alias, the method comprising:

upon request of the first client entity, the gaming server allowing the first client entity to join a first instance of the game, wherein the first client entity uses a first anonymous alias in the first instance of the game, and wherein the first default alias identifies an account associated with the first client entity, and the first anonymous alias does not identify the account;

upon request of the second client entity, the gaming server allowing the second client entity to join the first instance of the game, wherein the second client entity uses the second default alias in the first instance of the game;

the gaming server recording events occurring in the first instance of the game into a first history and a second history, wherein the first history uses the first default alias to represent the first client entity and the second default alias to represent the second client entity, and wherein the second history uses the first anonymous alias to represent the first client entity and the second default alias to represent the second client entity;

the gaming server determining that the first client entity has won the first instance of the game; and after completion of the first instance of the game, the gaming server providing the second history to the second client entity, wherein the gaming server does not reveal the first default alias to any non-server entity playing the game except for the first client entity.

15. The method of claim 14, wherein the game comprises a multi-state card game.

16. The method of claim 15, wherein the game comprises a poker game.

17. The method of claim 14, wherein the gaming server is coupled to the first client entity via a communication network, and wherein the first client entity using the first anonymous alias comprises, during play of the first instance of the game, the gaming server transmitting a representation of the first default alias to the first client entity via the communication network, and the gaming server transmitting a representation of the first anonymous alias to the second client entity via the communication network.

18. The method of claim 14, wherein the gaming server supports a second instance of the game in the form of a virtual table, provided by the gaming server, that does not allow participating client entities to use anonymous aliases.

19. The method of claim 14, wherein the gaming server allows client entities to subscribe to presence of aliases on the gaming server, wherein, by default, a given alias is marked present when a given client entity associated with the given alias is accessing the gaming server, and the given alias is marked not present when the given client entity associated with the given alias is not accessing the gaming server, the method further comprising:

the gaming server determining that the first client entity is accessing the gaming server and using the first anonymous alias; and in response to the determination, the gaming server marking the first default alias as not present, such that presence of the first default alias is not reported to other entities that have subscribed to the presence of the first default alias.

20. The method of claim 14, further comprising:

upon request of the first client entity, the gaming server allowing the first client entity to join a second instance of the game, wherein the first client entity uses the first anonymous alias in the second instance of the game;

upon request of the second client entity, the gaming server allowing the second client entity to join the second instance of the game, wherein the second client entity uses a second anonymous alias in the second instance of the game;

the gaming server recording events occurring in the second instance of the game into a third history and a fourth history, wherein the third history uses the first default alias to represent the first client entity and the second anonymous alias to represent the second client entity, and wherein the fourth history uses the first anonymous alias to represent the first client entity and the second default alias to represent the second client entity; and the gaming server making at least part of the third history available to the first client entity and making at least part of the fourth history available to the second client entity.

21. The method of claim 14, wherein the first history and the second history are stored in a common database.

22. The method of claim 14, wherein the recorded events in the first history comprise the first default alias, the second default alias, wagers made by players in the first instance of the game, and an outcome of the first instance of the game.

23. The method of claim 22, wherein the recorded events in the second history comprise the first anonymous alias, the second default alias, the wagers, and the outcome.

24. The method of claim 23, wherein the recorded events in the first history and the recorded events in the second history are stored in database tables, wherein the database tables comprise a first table containing the first anonymous alias and the second default alias, a second table containing the wagers, and a third table containing the outcome.

25. A method, performed by a gaming server that conducts a game, wherein all players in the game play anonymously, wherein the players include a first client entity that is associated with a first default alias and a second client entity that is associated with a second default alias, the method comprising:
upon request of the first client entity, the gaming server allowing the first client entity to join an instance of the game, wherein the first client entity uses a first anonymous alias in the instance of the game, and wherein the first default alias identifies a first account associated with the first client entity, and the first anonymous alias does not identify the first account;
upon request of the second client entity, the gaming server allowing the second client entity to join the instance of the game, wherein the second client entity uses a second anonymous alias in the instance of the game;
the gaming server recording events occurring in the instance of the game into a first history and a second history, wherein the first history uses the first default alias to represent the first client entity and the second anonymous alias to represent the second client entity, and wherein the second history uses the first anonymous alias to represent the first client entity and the second default alias to represent the second client entity;
the gaming server determining that the first client entity has won the instance of the game; and
after completion of the instance of the game, the gaming server providing the second history to the second client entity, wherein the gaming server does not reveal the first default alias to any non-server player in the game except for the first client entity.

26. The method of claim 25, wherein the players also include a third client entity that is associated with a third default alias, the method further comprising:
upon request of the third client entity, the gaming server allowing the third client entity to join the instance of the game using a third anonymous alias, wherein the third client entity uses a third anonymous alias in the instance of the game;
the gaming server also recording the events occurring in the instance of the game into a third history, wherein the third history uses first anonymous alias to represent the first client entity, the second anonymous alias to represent the second client entity, and the third default alias to represent the third client entity, and wherein the first history and the second history use the third anonymous alias to represent the third client entity; and
the gaming server making at least part of the third history available to the third client entity.

27. The method of claim 25, wherein the game comprises a multi-state card game.

28. The method of claim 27, wherein the game comprises a poker game.

29. The method of claim 25, wherein the gaming server is coupled to the first client entity via a communication network, and wherein the first client entity using the first anonymous alias comprises, during play of the instance of the game, the gaming server transmitting a representation of the first default alias to the first client entity via the communication network, and the gaming server transmitting a representation of the first anonymous alias to the second client entity via the communication network.

30. The method of claim 25, wherein the second default alias identifies a second account associated with the second client entity, and the second anonymous alias does not identify the second account.

31. The method of claim 25, wherein the gaming server allows client entities to subscribe to presence of aliases on the gaming server, wherein, by default, a given alias is marked present when a given client entity associated with the given alias is accessing the gaming server, and the given alias is marked not present when the given client entity associated with the given alias is not accessing the gaming server, the method further comprising:
the gaming server determining that the first client entity is accessing the gaming server and using the first anonymous alias; and
in response to the determination, the gaming server marking the first default alias as not present, such that presence of the first default alias is not reported to other entities that have subscribed to the presence of the first default alias.

32. The method of claim 25, wherein the first history and the second history are stored in a common database.

33. The method of claim 25, wherein the recorded events in the first history comprise the first default alias, the second anonymous alias, wagers made by players in the instance of the game, and an outcome of the instance of the game.

34. The method of claim 33, wherein the recorded events in the second history comprise the first anonymous alias, the second default alias, the wagers, and the outcome.

35. The method of claim 33, wherein the recorded events in the first history and the recorded events in the second history are stored in database tables, wherein the database tables comprise a first table containing the first anonymous alias and the second anonymous alias, a second table containing the wagers, and a third table containing the outcome.

36. A gaming server, wherein an account is associated with a first alias, the gaming server comprising:
a processor;
a data storage; and
program instructions, stored in the data storage and executable by the processor, to (i) allow a client entity using the first alias to access the gaming server, (ii) receive a first request from the client entity to join a first instance of a game hosted by the gaming server and to use a second alias during the first instance of the game, wherein the first alias is a default alias that identifies the account and the second alias is an anonymous alias that does not identify the account, (iii) in response to receiving the first request, include the client entity in the first instance of the game, (iv) during play of the first instance of the game, use the first alias to represent the account to the client entity, while using the second alias to represent the account to all other non-server entities involved in the first instance of the game, (v) record a first set of events occurring during the first instance of the game, wherein the recorded events in the first set represent the account with both the first alias and the second alias, (vi) determine that the client entity has won the first instance of the game, and (vii) after completion of the first instance of the game, provide a first version of the first set of events to all of the other non-server entities involved in the first instance of the game, wherein the first version of the first set of events uses the second alias to represent the account and, wherein the gaming server does not reveal the first alias to any of the other non-server entities.

37. The gaming server of claim 36, further comprising:
program instructions, stored in the data storage and executable by the processor, to after completion of the first instance of the game, provide a second version of the first set of events to the client entity, wherein the second version of the first set of events uses the first alias to represent the account.

38. The gaming server of claim 36, wherein the game comprises a multi-state card game.

39. The gaming server of claim 36, wherein the game comprises a poker game.

40. The gaming server of claim 36, further comprising:
an interface coupling the gaming server to the client entity and the other devices via a communication network, wherein the gaming server using the first alias to represent the account to the client entity comprises the gaming server transmitting a representation of the first alias to the client entity via the communication network, and wherein the gaming server using the second alias to represent the account to all of the other non-server entities comprises the gaming server transmitting a representation of the second alias to the other non-server entities via the communication network.

41. The gaming server of claim 36, wherein each of the other non-server entities is associated with a respective anonymous alias, the gaming server further comprising:
program instructions, stored in the data storage and executable by the processor, to, during play of the first instance of the game, use the respective anonymous alias to represent each of the other non-server entities to the client entity.

42. The gaming server of claim 36, wherein the gaming server supports a second instance of the game in the form of a virtual table, provided by the gaming server, that does not allow participating client entities to use anonymous aliases.

43. The gaming server of claim 36, wherein the gaming server allows client entities to subscribe to presence of aliases on the gaming server, wherein, by default, a given alias is marked present when a given client entity associated with the given alias is accessing the gaming server, and the given alias is marked not present when the given client entity associated with the given alias is not accessing the gaming server, the gaming server further comprising:
program instructions, stored in the data storage and executable by the processor, to (i) determine that the client entity is accessing the gaming server and using the second alias, and (ii) in response to the determination, mark the first alias as not present, such that presence of the first alias is not reported to other entities that have subscribed to the presence of the first alias.

44. The gaming server of claim 36, further comprising:
program instructions, stored in the data storage and executable by the processor, to (i) receive a second request from the client entity to join a second instance of a game hosted by the gaming server and to use a third alias during the second instance of the game, (ii) in response to receiving the second request, include the client entity in the second instance of the game, (iii) during play of the second instance of the game, use the first alias to represent the account to the client entity, while using the third alias to represent the account to other client entities involved in the second instance of the game, and (iv) record a second set of events occurring during the second instance of the game, wherein the recorded events in the second set represent the account with both the first alias and the third alias.

45. The gaming server of claim 44, further comprising:
program instructions, stored in the data storage and executable by the processor, to (i) provide a first subset of the second set of recorded events, in which the account is represented by the third alias, to the other client entities, and (ii) provide a second subset of the second set of recorded events, in which the account is represented by the first alias, to the client entity.

46. The gaming server of claim 36, wherein the recorded events in the first set comprise aliases that participated in the first instance of the game and an outcome of the first instance of the game.

47. The gaming server of claim 46, wherein the recorded events in the first set also comprise wagers made by players in the first instance of the game.

48. The gaming server of claim 47, further comprising:
a database that stores the recorded events in the first set, wherein the database comprises a first table containing the aliases, a second table containing the outcome, and a third table containing the wagers.

49. A gaming server that conducts a game involving a first client entity playing against a second client entity, wherein the first client entity is associated with a first default alias and the second client entity is associated with a second default alias, the gaming server comprising:
a processor;
a data storage; and
program instructions, stored in the data storage and executable by the processor, to (i) upon request of the first client entity, allow the first client entity to join a first instance of the game, wherein the first client entity uses a first anonymous alias in the first instance of the game, (ii) upon request of the first client entity, the gaming server allowing the first client entity to join a first instance of the game, wherein the first client entity uses a first anonymous alias in the first instance of the game, and wherein the first default alias identifies an account associated with the first client entity, and the first anonymous alias does not identify the account, (iii) upon request of the second client entity, allow the second client entity to join the first instance of the game, wherein the second client entity uses the second default alias in the first instance of the game, (iv) record events occurring in the first instance of the game into a first history and a second history, wherein the first history uses the first default alias to represent the first client entity and the second default alias to represent the second client entity, and wherein the second history uses the first anonymous alias to represent the first client entity and the second default alias to represent the second client entity, (v) determine that the first client entity has won the first instance of the game, and (vi) after completion of the first instance of the game, provide the second history to the second client entity, wherein the gaming server does not reveal the first default alias to any non-server entity playing the game except for the first client entity.

50. The gaming server of claim 49, wherein the game comprises a multi-state card game.

51. The gaming server of claim 50, wherein the game comprises a poker game.

52. The gaming server of claim 49, further comprising:
an interface coupling the gaming server to the first client entity via a communication network, wherein the first client entity using the first anonymous alias comprises, during play of the first instance of the game, the gaming server transmitting a representation of the first default alias to the first client entity via the communication network, and the gaming server transmitting a representation of the first anonymous alias to the second client entity via the communication network.

53. The gaming server of claim 49, wherein the gaming server supports a second instance of the game in the form of a virtual table, provided by the gaming server, that does not allow participating client entities to use anonymous aliases.

54. The gaming server of claim 49, wherein the gaming server allows client entities to subscribe to presence of aliases on the gaming server, wherein, by default, a given alias is marked present when a given client entity associated with the given alias is accessing the gaming server, and the given alias is marked not present when the given client entity associated with the given alias is not accessing the gaming server, the gaming server further comprising:
program instructions, stored in the data storage and executable by the processor, to (i) determine that the first client entity is accessing the gaming server and using the first anonymous alias, and (ii) in response to the determination, mark the first default alias as not present, such that presence of the first default alias is not reported to other entities that have subscribed to the presence of the first default alias.

55. The gaming server of claim 49, further comprising:
program instructions, stored in the data storage and executable by the processor, to (i) upon request of the first client entity, allow the first client entity to join a second instance of the game, wherein the first client entity uses the first anonymous alias in the second instance of the game, (ii) upon request of the second client entity, allow the second client entity to join the second instance of the game, wherein the second client entity uses a second anonymous alias in the second instance of the game, (iii) record events occurring in the first instance of the game into a third history and a fourth history, wherein the third history uses the first default alias to represent the first client entity and the second anonymous alias to represent the second client entity, and wherein the fourth history uses the first anonymous alias to represent the first client entity and the second default alias to represent the second client entity, and (iv) make at least part of the third history available to the first client entity and making at least part of the fourth history available to the second client entity.

56. The gaming server of claim 49, wherein the first history and the second history are stored in a common database.

57. The gaming server of claim 49, wherein the recorded events in the first history comprise the first default alias, the second default alias, wagers made by players in the first instance of the game, and an outcome of the first instance of the game.

58. The gaming server of claim 57, wherein the recorded events in the second history comprise the first anonymous alias, the second default alias, the wagers, and the outcome.

59. The gaming server of claim 58, further comprising:
a database that stores the recorded events in the first history and the recorded events in the second history in database tables, wherein the database tables comprise a first table containing the first anonymous alias and the second default alias, a second table containing the wagers, and a third table containing the outcome.

60. A gaming server that conducts a game, wherein all players in the game play anonymously, wherein the players include a first client entity that is associated with a first default alias and a second client entity that is associated with a second default alias, the gaming server comprising:
a processor;
a data storage; and
program instructions, stored in the data storage and executable by the processor, to (i) upon request of the first client entity, allow the first client entity to join an instance of the game, wherein the first client entity uses a first anonymous alias in the instance of the game, wherein the first default alias identifies a first account associated with the first client entity, and the first anonymous alias does not identify the first account, (ii) upon request of the second client entity, allow the second client entity to join the instance of the game, wherein the second client entity uses a second anonymous alias in the instance of the game, (iii) record events occurring in the instance of the game into a first history and a second history, wherein the first history uses the first default alias to represent the first client entity and the second anonymous alias to represent the second client entity, and wherein the second history uses the first anonymous alias to represent the first client entity and the second default alias to represent the second client entity, (iv) determine that the first client entity has won the instance of the game, and (v) after completion of the instance of the game, provide the second history to the second client entity, wherein the gaming server does not reveal the first default alias to any non-server player in the game except for the first client entity.

61. The gaming server of claim 60, wherein the players also include a third client entity that is associated with a third default alias, the gaming server further comprising:
program instructions, stored in the data storage and executable by the processor, to (i) upon request of the third client entity, allow the third client entity to join the instance of the game, wherein the third client entity uses a third anonymous alias in the instance of the game, (ii) also record the events occurring in the instance of the game into a third history, wherein the third history uses first anonymous alias to represent the first client entity, the second anonymous alias to represent the second client entity, and the third default alias to represent the third client entity, and wherein the first history and the second history use the third anonymous alias to represent the third client entity, and (iii) make at least part of the third history available to the third client entity.

62. The gaming server of claim 60, wherein the game comprises a multi-state card game.

63. The gaming server of claim 60, wherein the game comprises a poker game.

64. The gaming server of claim 60, further comprising:
an interface coupling the gaming server to the first client entity via a communication network, and wherein the first client entity using the first anonymous alias comprises, during play of the instance of the game, the gaming server transmitting a representation of the first default alias to the first client entity via the communication network, and the gaming server transmitting a representation of the first anonymous alias to the second client entity via the communication network.

65. The gaming server of claim 60, wherein the second default alias identifies a second account associated with the second client entity, and the second anonymous alias does not identify the second account.

66. The gaming server of claim 60, wherein the gaming server allows client entities to subscribe to presence of aliases on the gaming server, wherein, by default, a given alias is marked present when a given client entity associated with the given alias is accessing the gaming server, and the given alias is marked not present when the given client entity associated with the given alias is not accessing the gaming server, the gaming server further comprising:

program instructions, stored in the data storage and executable by the processor, to (i) determine that the first client entity is accessing the gaming server and using the first anonymous alias, and (ii) in response to the determination, mark the first default alias as not present, such that presence of the first default alias is not reported to other entities that have subscribed to the presence of the first default alias.

67. The method of claim 60, wherein the first history and the second history are stored in a common database.

68. The gaming server of claim 60, wherein the recorded events in the first history comprise the first default alias, the second anonymous alias, wagers made by players in the instance of the game, and an outcome of the instance of the game.

69. The gaming server of claim 68, wherein the recorded events in the second history comprise the first anonymous alias, the second default alias, the wagers, and the outcome.

70. The gaming server of claim 69, further comprising:

a database that stores the recorded events in the first history and the recorded events in the second history in database tables, wherein the database tables comprise a first table containing the first anonymous alias and the second anonymous alias, a second table containing the wagers, and a third table containing the outcome.

\* \* \* \* \*